United States Patent
Walker

(10) Patent No.: US 11,608,161 B2
(45) Date of Patent: Mar. 21, 2023

(54) FLAP ACTUATION SYSTEMS AND RELATED METHODS

(71) Applicant: The Boeing Company, Chicago, IL (US)

(72) Inventor: Steven Paul Walker, Arlington, WA (US)

(73) Assignee: The Boeing Company, Chicago, IL (US)

(*) Notice: Subject to any disclaimer, the term of this patent is extended or adjusted under 35 U.S.C. 154(b) by 306 days.

(21) Appl. No.: 16/843,569

(22) Filed: Apr. 8, 2020

(65) Prior Publication Data

US 2021/0316842 A1  Oct. 14, 2021

(51) Int. Cl.
| | |
|---|---|
| *B64C 13/24* | (2006.01) |
| *B64C 9/04* | (2006.01) |
| *B64C 13/16* | (2006.01) |
| *B64C 13/32* | (2006.01) |
| *B64C 13/34* | (2006.01) |
| *B64C 13/38* | (2006.01) |

(52) U.S. Cl.
CPC .............. *B64C 13/24* (2013.01); *B64C 9/04* (2013.01); *B64C 13/16* (2013.01); *B64C 13/32* (2013.01); *B64C 13/34* (2013.01); *B64C 13/38* (2013.01)

(58) Field of Classification Search
CPC ........... B64C 13/24; B64C 9/04; B64C 13/16; B64C 13/32; B64C 13/34; B64C 13/38; B64C 13/28; B64C 13/341
See application file for complete search history.

(56) References Cited

U.S. PATENT DOCUMENTS

| | | | |
|---|---|---|---|
| 4,207,442 A | * | 6/1980 | Freeman .................. H04R 3/00 381/174 |
| 6,755,375 B2 | | 6/2004 | Trikha |
| 7,100,870 B2 | | 9/2006 | Flatt |
| 7,410,132 B1 | | 8/2008 | Flatt |

(Continued)

FOREIGN PATENT DOCUMENTS

| | | |
|---|---|---|
| DE | 102012022287 | 5/2014 |
| JP | 4890845 | 6/2007 |

OTHER PUBLICATIONS

European Patent Office, "Extended European Search Report," issued in connection with European Patent Application No. 21167476.7, dated Aug. 16, 2021, 11 pages.

*Primary Examiner* — Medhat Badawi
*Assistant Examiner* — Vicente Rodriguez
(74) *Attorney, Agent, or Firm* — Hanley, Flight & Zimmerman, LLC

(57) ABSTRACT

Example flap actuation systems and related methods are disclosed herein. An example flap actuation system includes a first actuator, a second actuator, a first drive arm coupled to the first actuator and to a flap, a second drive arm coupled to the second actuator and to the flap, a first cam, and a first output shaft. The first cam is to couple to the first drive to enable the first actuator to actuate the flap via the first drive arm. The example flap actuation system includes a second cam and a second output shaft. The first cam is to be uncoupled from the first drive arm in response to a failure of the first actuator. The second actuator is to actuate the flap via the first drive arm and the second drive arm in response to the failure of the first actuator.

20 Claims, 11 Drawing Sheets

(56) References Cited

U.S. PATENT DOCUMENTS

| | | | |
|---|---|---|---|
| 7,494,094 B2* | 2/2009 | Good | B64C 9/14 |
| | | | 244/215 |
| 7,610,828 B2 | 11/2009 | Wingett et al. | |
| 8,746,614 B2 | 6/2014 | Heintjes | |
| 9,114,872 B2 | 8/2015 | Marques et al. | |
| 9,190,942 B2* | 11/2015 | Polcuch | H02P 8/40 |
| 9,260,181 B2* | 2/2016 | Conrad | B64C 3/44 |
| 9,376,204 B2* | 6/2016 | Winkelmann | B64D 45/0005 |
| 9,682,769 B2 | 6/2017 | Richter | |
| 2004/0200928 A1* | 10/2004 | Degenholtz | B64C 13/341 |
| | | | 244/99.2 |
| 2005/0103928 A1 | 5/2005 | Flatt | |
| 2006/0113933 A1 | 6/2006 | Blanding et al. | |
| 2007/0108343 A1 | 5/2007 | Wingett et al. | |
| 2007/0194738 A1 | 8/2007 | Hirai | |
| 2010/0213311 A1 | 8/2010 | Flatt et al. | |
| 2011/0089877 A1 | 4/2011 | Blanding et al. | |
| 2014/0018203 A1* | 1/2014 | Huang | F16H 1/32 |
| | | | 475/168 |
| 2016/0355253 A1 | 12/2016 | Nfonguem et al. | |

* cited by examiner

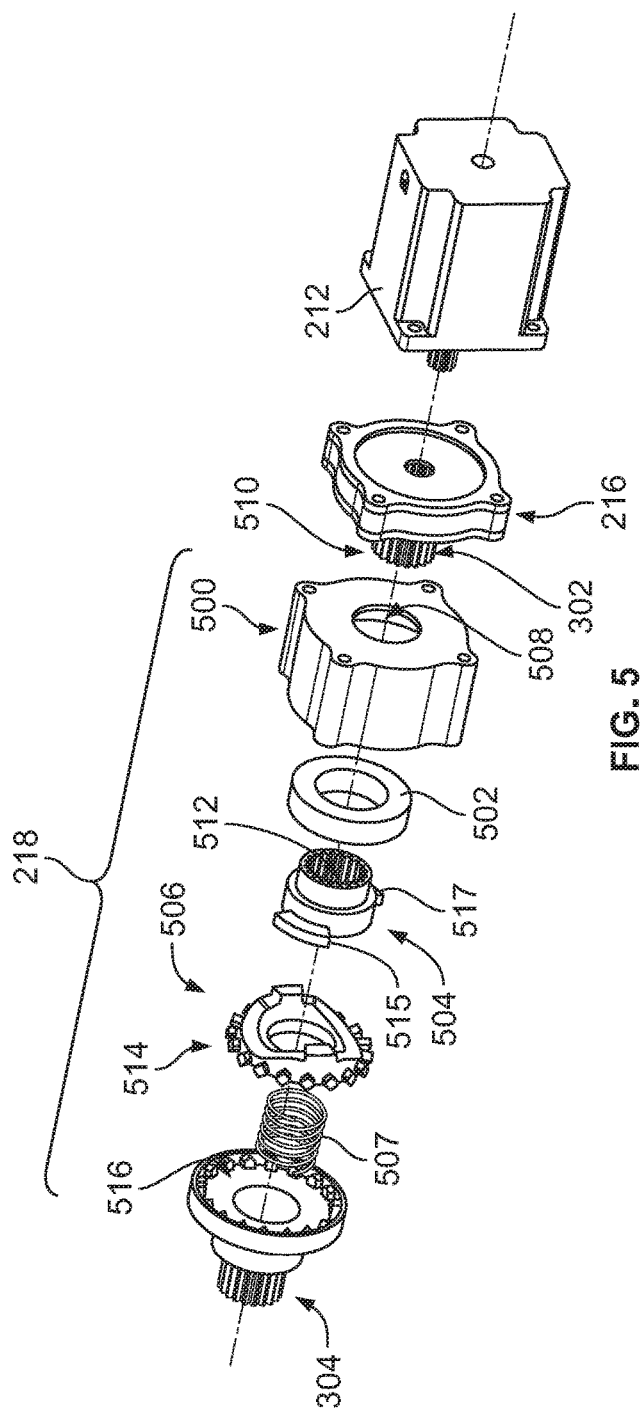
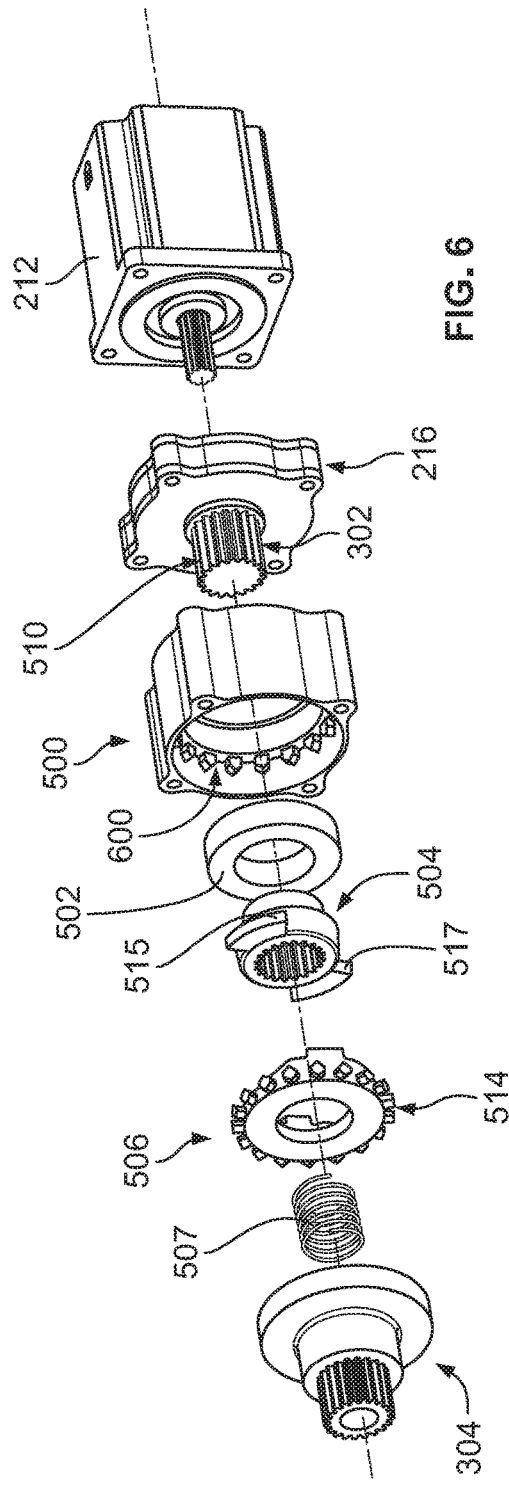

FLAP ACTUATION SYSTEMS AND RELATED METHODS

FIELD OF THE DISCLOSURE

This disclosure relates generally to airflow control surfaces of an air vehicle, and, more particularly, to flap actuation systems and related methods.

BACKGROUND

An air vehicle such as a fixed-wing plane includes control surfaces coupled to a wing of the air vehicle that are selectively actuated to affect behavior of the air vehicle during takeoff, flight, and/or landing. For instance, a flap can be extended during takeoff or landing to increase lift of the wing and retracted to reduce drag when, for example, the air vehicle reaches a cruising altitude. Control surfaces such as flaps are coupled to the wing via support structures.

SUMMARY

An example flap actuation system includes a first actuator, a second actuator, a first drive arm coupled to the first actuator and to a flap, a second drive arm coupled to the second actuator and to the flap, a first cam, and a first output shaft. The first cam is to couple to the first drive arm via the first output shaft during operation of the first actuator to enable the first actuator to actuate the flap via the first drive arm. The example flap actuation system includes a second cam and a second output shaft. The second cam is to couple to the second drive arm via the second output shaft during operation of the second actuator to enable the second actuator to actuate the flap via the second drive arm. The first cam is to be uncoupled from the first drive arm in response to a failure of the first actuator. The second actuator is to actuate the flap via the first drive arm and the second drive arm in response to the failure of the first actuator.

An example aircraft includes a flap, a first actuator, a second actuator, a first drive arm coupled to the flap, a second drive arm coupled to the flap, a first coupler to selectively couple the first actuator to the flap via the first drive arm, and a second coupler to selectively couple the second actuator to the flap via the second drive arm.

An example system includes a first actuator, a second actuator, a drive arm coupled to a flap of a vehicle, a coupler disposed between the first actuator and the drive arm. The coupler includes a cam. The cam is to selectively couple with the drive arm to operatively couple the first actuator to the drive arm. The example system includes a controller to control the coupling of the first actuator to the drive arm via the coupler. The controller to instruct the second actuator to drive movement of the flap when the cam is uncoupled from the drive arm.

BRIEF DESCRIPTION OF THE DRAWINGS

FIGS. 5 and 6 are exploded views of a coupler of the example first drive subsystem of FIGS. 3 and 4.

Figure 1:
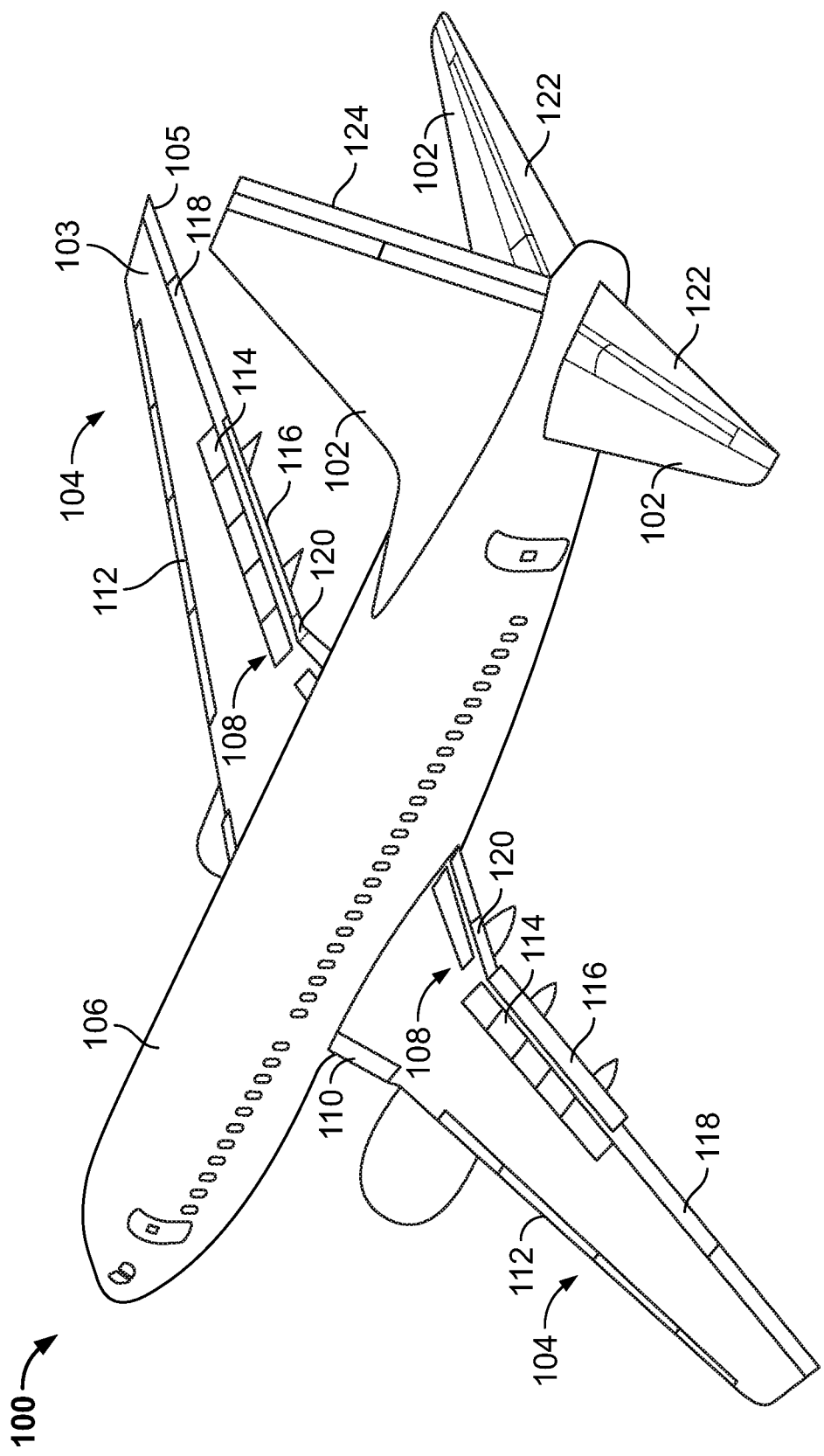
FIG. 1 illustrates an example air vehicle in which examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some air vehicles, such as an aircraft, include airflow control surfaces such as a flap coupled to a wing of the aircraft. The flap can be selectively actuated to affect behavior of the aircraft during one or more stages of flight, such as takeoff and/or landing. For instance, the flap can be extended during takeoff or landing to increase lift of the wing. When the aircraft is in a cruise stage of flight, the flap can be retracted to reduce drag. Movement of the flap can be controlled by a drive system including actuator(s) (e.g., motor(s)) that cause the flap to move between the extended and retracted positions via mechanical support linkages that operatively couple the actuator(s) to the flap.

Asymmetries in the drive system of the flap resulting from, for instance, performance of the actuator(s), can impart twisting forces on the support linkage(s) of the flap. Flap skew can disrupt the airflow control provided by the flap. For example, angular misalignment between two support linkages of the flap due to skew conditions can result in asymmetry between portions of the flap when the flap is deployed. Some known aircraft include sensor(s) to detect skew conditions at the flap by monitoring for, for instance, misalignment between the support linkages. If a skew condition is detected based on the sensor data, the flap may not be deployed. Although refraining from deploying the flap may prevent skew, the behavior of the aircraft can be affected. For example, the aircraft may land at a higher speed because the flap is not extended to maintain lift and increase drag to slow the aircraft Disclosed herein are example dual drive systems for actuating a control surface of an aircraft, such as a flap, that reduce instances of skew conditions and enable the control surface to be actuated in the event of failure of one of the actuators of the drive system. Examples disclosed herein include a first dual drive system to control a first support linkage of a flap and a second dual drive system to control a second support linkage of the flap. The example dual drive systems disclosed herein include a first drive subsystem including a first actuator and a second drive subsystem including a second actuator. In the event of failure of the actuator of one of the drive subsystems, the actuator of the other drive subsystem can be used to control movement of the flap via the support linkage. Thus, in examples disclosed herein, the dual drive system associated with each flap support linkage reduces skew that would otherwise result if one of the support linkages was unable to provide for movement of the flap due to a failed actuator at that support linkage.

In examples disclosed herein, each drive subsystem of the dual drive system includes a coupler that provides for selective, operative coupling between the actuator and a corresponding support linkage of the flap. Example couplers disclosed herein include a cam having teeth and an output shaft having corresponding teeth. The output shaft is operatively coupled to one of the flap support linkages via a drive linkage. During operation of the actuator of, for example, a first drive subsystem of the dual drive system, a drive ring causes the teeth of the cam to engage with the teeth of the output shaft. The coupling of the cam to the output shaft operatively couples the actuator to the drive linkage and, thus, the flap support linkage. The actuator of the first drive subsystem can be used to control movement of the flap via the drive linkage and the support linkage to which the drive linkage is coupled.

In the event of failure of the actuator of, for example, the first drive subsystem, the drive ring of the coupler is no longer driven by the failed actuator. As a result, the teeth of the cam of the coupler do not engage with the teeth of the output shaft. Thus, example couplers disclosed herein prevent an operative coupling between the failed actuator of the first drive subsystem and the drive linkage of the first drive subsystem that couples with the flap support linkage. In such examples, the actuator of the second drive subsystem of the dual drive system can be used to control movement of the flap via the support linkage without interference from the failed actuator of the first drive subsystem. In particular, the drive linkage associated with the first drive subsystem can be controlled by the actuator of the second drive subsystem, as that drive linkage is no longer operatively coupled to the failed actuator. Thus, asymmetries with respect to the drive linkages at the dual drive system including the failed actuator are reduced. Further, in examples disclosed herein, because the actuator of the second drive subsystem is able to control the movement of the flap via the corresponding support linkage, skew is prevented at the flap, as each support linkage of the flap continues to be controlled via an actuator. Thus, example disclosed herein isolate the effects of a failed actuator via dual drive systems that provide for continued control of flap movement.

FIG. 1 illustrates an example aircraft 100 in which the examples disclosed herein may be implemented. In the illustrated example, the aircraft 100 includes stabilizers 102 and wings 104 coupled to a fuselage 106. The wings 104 define upper and lower surfaces 103, 105 (e.g., upper and lower sides, upper and lower aerodynamic surfaces, etc.), respectively. The wings 104 of the aircraft 100 have control surfaces 108 located along the leading and/or trailing edges of the wings 104. The control surfaces 108 may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 110, leading edge slats 112, upper spoilers 114 (e.g., flight spoilers, ground spoilers, upper surface spoilers, etc.), and trailing edge flaps (e.g., rotatable flaps) 116. The control surfaces 108 of the illustrated example also include ailerons 118 and flaperons 120. In this example, the stabilizers 102 include elevators 122 and a rudder 124.

To control flight of the aircraft 100, the upper surface spoilers 114 of the illustrated example alter the lift and drag of the aircraft 100. The flaps 116 alter the lift of the aircraft 100. The ailerons 118 and the flaperons 120 of the illustrated example alter the roll of the aircraft 100. In this example, the leading edge slats 112 alter the lift of the aircraft 100. The control surfaces 108 of the illustrated example also play a role in controlling the speed of the aircraft 100. For example, the upper surface spoilers 114 may be used for braking of the aircraft 100. Any of the control surfaces 108 of the illustrated example may be independently moved (e.g., deflected) to control the load distribution in different directions over the respective wings 104, thereby directing movement of the aircraft 100.

The examples described herein may be applied to control surfaces associated with any of the stabilizers 102, the wings 104 and/or any other exterior or outboard structure (e.g., a horizontal stabilizer, a wing strut, an engine strut, a canard stabilizer, slats, etc.) of the aircraft 100. In particular, the wings 104 and/or the stabilizers 102 may have control surfaces 108 that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100. Thus, the discussion of examples disclosed herein in connection with flaps is for illustrated purposes only and does not limit the examples to use with flaps.

Figure 2:
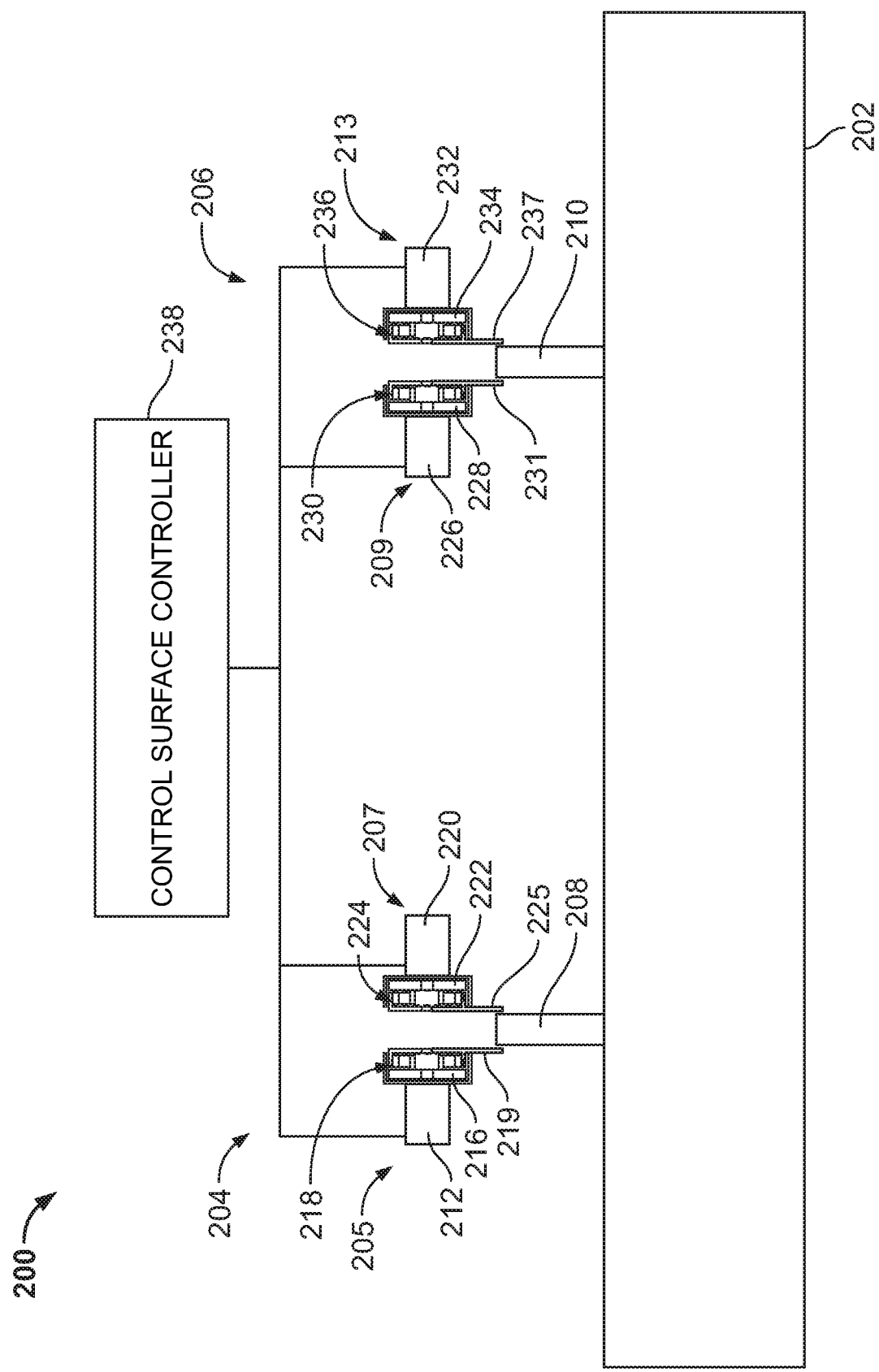
FIG. 2 illustrates an example flap actuation system including a first dual drive system, a second dual drive system, and a control surface controller in accordance with teachings of this disclosure.

FIG. 2 illustrates an example flap actuation system 200 in accordance with teachings of this disclosure. The example flap actuation system 200 controls movement of a flap 202 between an extended position to increase lift of a wing (e.g., the wing 104 of FIG. 1) including the flap 202 and a retracted position to reduce drag. The example flap actuation system 200 includes a first dual drive system 204 and a second dual drive system 206. The first dual drive system 204 is operatively coupled to the flap 202 via a first flap support linkage 208. The second dual drive system 206 is operatively coupled to the flap 202 via a second flap support linkage 210. The example flap actuation system 200 can include additional support linkage(s) and corresponding dual drive system(s) than shown in the example of FIG. 2. Also, the spacing between the flap support linkages 208, 210 can differ from the example shown in FIG. 2.

The first dual drive system 204 of FIG. 2 includes a first drive subsystem 205 and a second drive subsystem 207. The first drive subsystem 205 includes a first actuator 212 (e.g., a servomotor). The first actuator 212 is operatively coupled to the first flap support linkage 208 via a first cycloidal drive 216, a first coupler 218, and a first drive linkage or arm 219. The second drive subsystem 207 includes a second actuator 220 (e.g., a servomotor). The second actuator 220 is operatively coupled to the first flap support linkage 208 via a second cycloidal drive 222, a second coupler 224, and a second drive arm 225.

Similarly, the second dual drive system 206 of FIG. 2 includes a third drive subsystem 209 and a fourth drive subsystem 213. The third drive subsystem 209 includes a third actuator 226 (e.g., a servomotor). The third actuator 226 is operatively coupled to the second flap support linkage 210 via a third cycloidal drive 228, a third coupler 230, and a third drive arm 231. The fourth drive subsystem 213 includes a fourth actuator 232 (e.g., a servomotor). The fourth actuator 232 is operatively coupled to the second flap support linkage 210 via a fourth cycloidal drive 234, a fourth coupler 236, and a fourth drive arm 237.

In operation, power generated by the actuator(s) 212, 220, 226, 232 is used to drive movement of the drive arms 219, 225, 231, 237 of each drive subsystem 205, 207, 209, 213, which results in movement of the respective flap support linkages 208, 210 and, thus, the flap 202. In the example of FIG. 2, operation of the actuator(s) 212, 220, 226, 232 and, thus, movement of the flap 202, is controlled by a control surface controller 238. The example control surface controller 238 is communicatively coupled to the respective actuators 212, 220, 226, 232 via one or more wired or wireless communication protocols. As disclosed herein, the control surface controller 238 generates instruction(s) that are transmitted to the actuator(s) 212, 220, 226, 232 to control movement of the flap 202 from a stored position to one or more of an extended position or a drooped position. In some examples, the instruction(s) generated by the control surface controller 238 control a speed at which the flap 202 is moved, a duration for which the flap 202 is in a particular position, etc.

The example flap actuation system 200 of FIG. 2 provides for redundancy in controlling movement of the flap 202, as each flap support linkage 208, 210 is controlled by one of the dual drive systems 204, 206. As disclosed herein, the couplers 218, 224, 230, 236 of the respective drive subsystems 205, 207, 209, 213 of each dual drive system 204, 206 can operatively isolate or separate the corresponding actuators 212, 220, 226, 232 from the flap 202 if there is a failure of one of the actuator(s) 212, 220, 226, 232 of a particular drive subsystem 205, 207, 209, 213. For instance, in the event of failure of the first actuator 212 of the first drive subsystem 205, the first coupler 218 prevents an operative coupling between the first drive arm 219 of the first drive subsystem 205 and the failed first actuator 212. In such examples, movement of the flap 202 via the first flap support linkage 208 is controlled by the second actuator 220 of the second drive subsystem 207. Because the first drive arm 219 is not operatively coupled to the failed first actuator 212, the first drive arm 219 can move in response to movement of the second drive arm 225 by the second actuator 212 (i.e., because of the coupling of each drive arm 219, 225 to the first flap support linkage 208). Thus, the first and second drive arms 219, 225 can be used to control movement of the first flap support linkage 208 and asymmetries within the first dual drive system 204 are prevented or substantially reduced. Further, flap skew is prevented or substantially reduced despite failure of the first actuator 212, as the first and second flap support linkages 208, 210 can continue to be used to move the flap 202 due to the redundancy in actuators 212, 220 at the first dual drive system 204.

Figure 3:
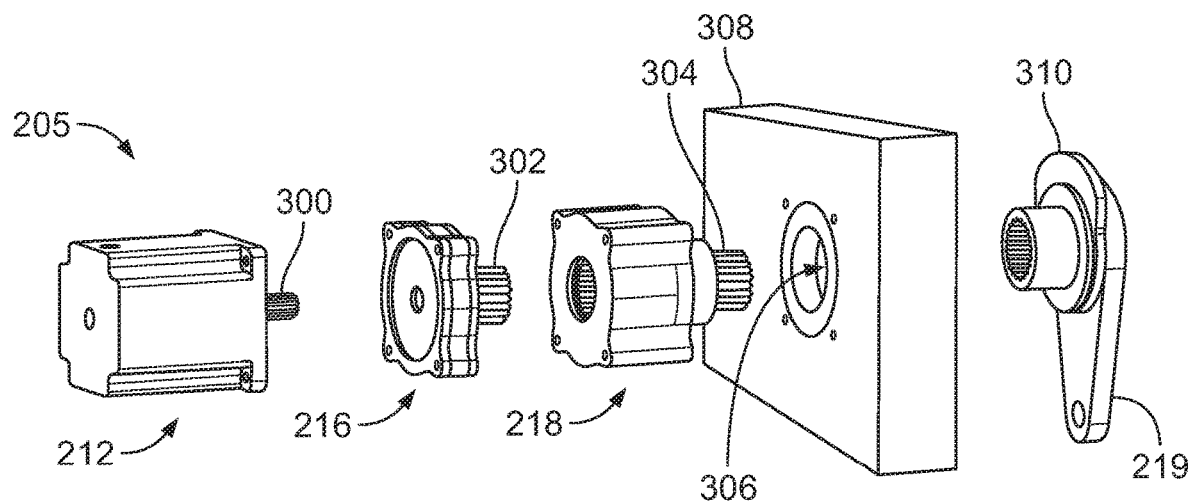
FIGS. 3 and 4 are exploded views of a first drive subsystem of the first dual drive system of FIG. 2.
Figure 4:
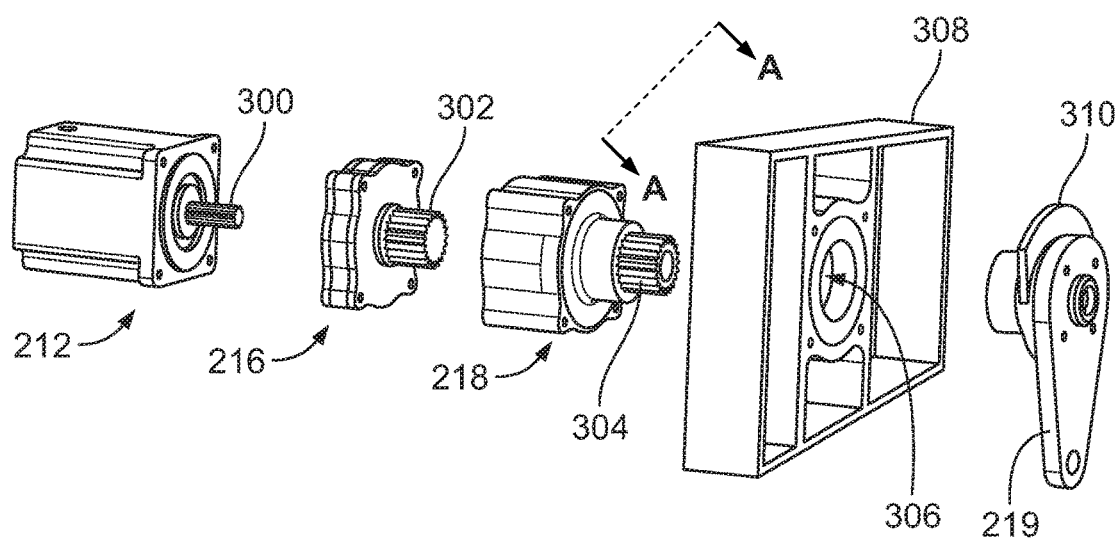

FIGS. 3 and 4 are exploded views of the first drive subsystem 205 of the example first dual drive system 204 of FIG. 2. Although FIGS. 3 and 4 are discussed in connection with the example first drive subsystem 205 of FIG. 2, the second drive subsystem 207 of the first dual drive system 204 of FIG. 2 includes the same or substantially the same components as the first drive subsystem 205 (e.g., where the component(s) of the second drive subsystem are arranged in a mirror image of the components of the first drive subsystem 205). Also, the third drive subsystem 209 and the fourth drive subsystem 213 of the second dual drive system 206 can include the same or substantially the same component(s) as the first drive subsystem 205 shown in FIGS. 3 and 4.

As shown in FIGS. 3 and 4, an output shaft 300 of the actuator 212 of the first drive subsystem 205 couples with the cycloidal drive 216. An output shaft 302 of the cycloidal drive 216 is received by the first coupler 218 to operatively couple the actuator 212 to the first coupler 218. In the example of FIGS. 3 and 4, the substantially flat profile of the cycloidal drive 216 helps to reduce the form factor of the first drive subsystem 205 and, thus, the form factor of the first dual drive system 204 as compared to the form factor that would result if another gear type (e.g., a planetary gear) was used. The reduced form factor of the first drive subsystem 205 can help offset the additional volume consumed by the use of dual actuators at each flap support linkage 208, 210 (FIG. 2). In other examples, a planetary gear could be used in lieu of the cycloidal drive to provide for gear reduction that is otherwise provided by the cycloidal drive 216 of FIG. 2. Alternatively, in other examples, an actuator having increased power could be used to drive the first coupler 218 directly, with no means of gear reduction.

As shown in FIG. 3, an output shaft 304 of the first coupler 218 extends through an opening 306 defined in a rib 308 to enable the output shaft 304 to couple with the first drive arm 219. In an example aircraft such as the aircraft 100 of FIG. 1, the rib 308 is one of a plurality of ribs that define a trailing edge of a wing (e.g., the wing 104 of FIG. 1) that includes the flap 202 (FIG. 2). The rib(s) 308 support trailing edge components of the wing, such as the flap 202 and the flap actuation system 200 of FIGS. 2-4.

In the example of FIGS. 3 and 4, the first drive arm 219 includes a brake 310. As disclosed herein, operation of the brake 310 is controlled by the control surface controller 238 of FIG. 2. The brake 310 can be activated to, for example, lock the first drive arm 219 and, thus the flap 202 in a particular position (e.g., when the flap 202 is extended). As disclosed herein, in some examples, the brake 310 is activated in the event of failure of the first actuator 212 to stiffen the first drive arm 219 and provide a degree of resistance or control with respect to movement of the first drive arm 219 via the second actuator 220 of the second drive subsystem 207 (FIG. 2).

FIGS. 5 and 6 are exploded views of the first coupler 218 of the first drive subsystem 205 of the example first dual drive system 204 of FIGS. 2-4. Although the first coupler 218 of the first drive subsystem 205 is shown in FIGS. 5 and 6, the second, third, and fourth couplers 224, 230, 236 of the respective second, third, and fourth drive subsystems 207, 209, 213 of FIG. 2 include the same or substantially the same components as the first coupler 218 shown in FIGS. 5 and 6.

The example first coupler 218 of FIGS. 5 and 6 includes a housing 500, a bearing 502, a drive ring 504, a cam 506, a spring 507, and the output shaft 304. The housing 500 defines an opening 508 to receive the output shaft 302 of the cycloidal drive 216. The output shaft 302 of the cycloidal drive 216 extends through the opening 508 in the housing 500 and engages the drive ring 504. In the example of FIGS. 5 and 6, teeth 510 of the output shaft 302 of the cycloidal drive 216 engage with corresponding teeth 512 of the drive ring 504 to enable rotational movement to be transferred from the cycloidal drive 216 to the drive ring 504. The bearing 502 reduces friction between the drive ring 504 and the housing 500 during rotation of the drive ring 504.

In the example of FIGS. 5 and 6, the cam 506 is disposed between the drive ring 504 and the output shaft 304. As shown in FIGS. 5 and 6, the drive ring 504 includes a first protrusion 515 and a second protrusion 517 extending from a body of the drive ring 504. As disclosed herein, the protrusions 515, 517 of the drive ring 504 are in contact with the cam 506 to transfer movement from the drive ring 504 to the cam 506. The drive ring 504 can include additional or fewer protrusions and/or protrusions having different shapes and/or sizes than the example protrusions 515, 517 shown in FIGS. 5 and 6.

As shown in FIG. 5, the cam 506 includes a set of teeth 514 and the output shaft 304 includes a set of teeth 516. As shown in FIG. 6, the housing 500 includes a set of teeth 600 defined in an interior of the housing 500. In operation, the cam 506 selectively moves between a first position in which the teeth 514 of the cam 506 are engaged with the teeth 600 of the housing 500 and a second position in which the teeth 514 of the cam 506 are engaged with the teeth 516 of the output shaft 304. In particular and as disclosed herein, rotational movement of the drive ring 504 causes the cam 506 to translate from the first position in which the teeth 514 of the cam 506 are engaged with the teeth 600 of the housing 500 to the second position in which the teeth 514 of the cam 506 are engaged with the teeth 516 of the output shaft 304.

As shown in FIGS. 5 and 6, the spring 507 is disposed between the cam 506 and the output shaft 304. When the cam 506 is in the first position in which the teeth 514 of the cam 506 are engaged with the teeth 600 of the housing 500, the spring 507 is in an expanded position. In the expanded position, the spring 507 helps to maintain the position of the cam 506 in the housing 500 and, thus, the engagement between the teeth 600 of the housing 500 and the teeth 514 of the cam 506. When the cam 506 moves to the second position in which the teeth 514 of the cam 506 engage with the teeth 516 of the output shaft 304, the spring 507 is compressed as a result of the translation of the cam 506.

Figure 7:
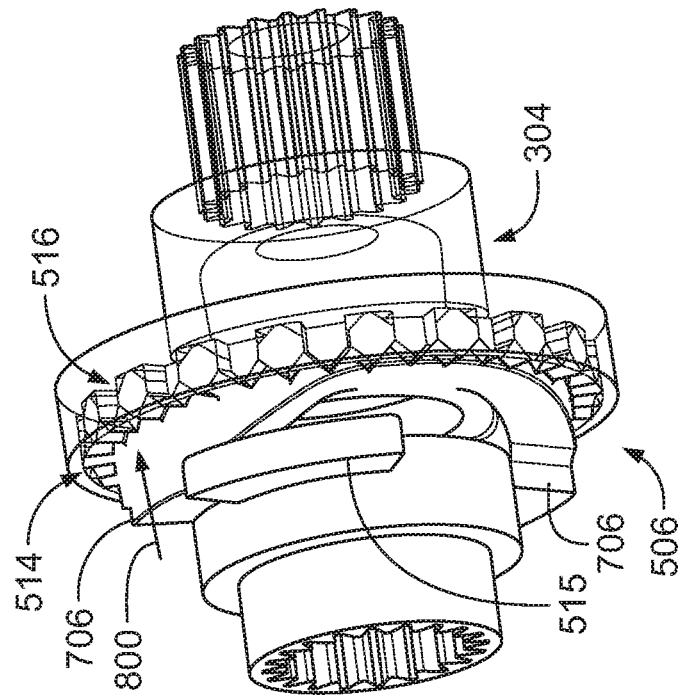
FIG. 7 is a partial view of the example coupler of FIGS. 5 and 6 in a first position.
Figure 8:
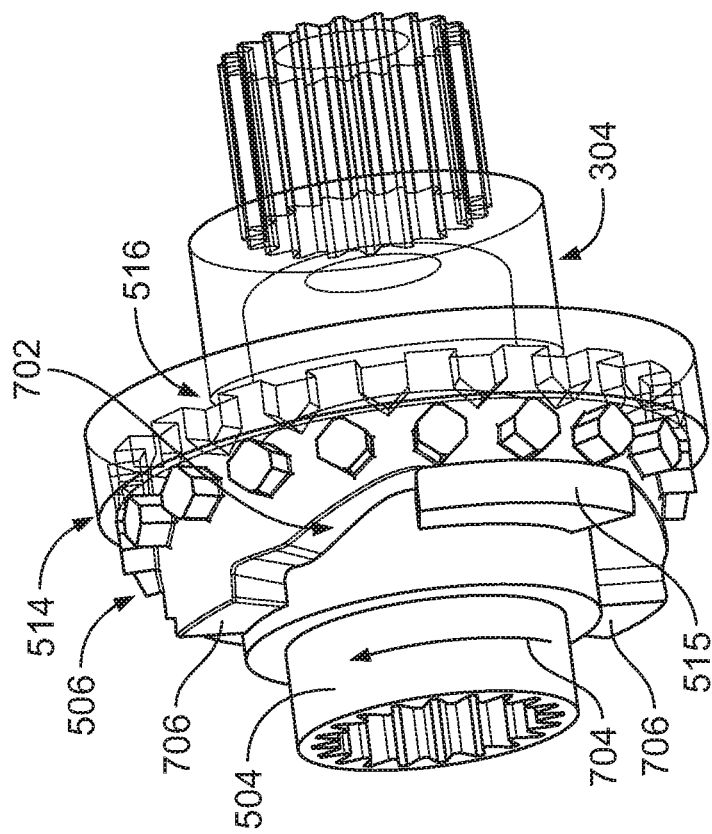
FIG. 8 is a partial view of the example coupler of FIGS. 5-7 in a second position.

FIGS. 7 and 8 illustrate the relationship between the drive ring 504, the cam 506, and the output shaft 304 of the example first coupler 218 of FIGS. 5 and 6. For clarity, the housing 500 is not shown in FIGS. 7 and 8.

In FIG. 7, the cam 506 is in the first position in which the teeth 514 are engaged with the teeth 600 of the housing 500 (FIG. 6). As shown in FIGS. 7 and 8, the cam 506 includes one or more ramps 702, or a partially sloped surface(s) defined by a body of the cam 506. During rotation of the drive ring 504, as represented by arrow 704 in FIG. 7, the protrusion(s) of the drive ring 504, such as the first protrusion 515 shown in FIGS. 7 and 8, moves along the ramp 702 of the cam 506. The movement of the protrusion 515 of the drive ring 504 along the ramp 702 of the cam 506 causes translational movement of the cam 506 with respect to the output shaft 304, as represented by arrow 800 in FIG. 8. As a result of rotational movement of the drive ring 504 and corresponding translation of the cam 506, the cam 506 moves the from the first position in which the teeth 514 of the cam 506 are engaged with the teeth 600 of the housing 500 to the second position in which the teeth 514 of the cam 506 are engaged with the teeth 516 of the output shaft 304 (FIGS. 5 and 6).

As shown in FIGS. 7 and 8, the cam 506 includes one or more protrusions or stops 706 proximate to the ramp 702. When the protrusion 515 (and/or the protrusion 517 shown in FIGS. 5 and 6) of the drive ring 504 engages with one of the stops 706 of the cam 506, rotational movement of the drive ring 504 is transferred to the output shaft 304 via the coupling between the drive ring 504, the cam 506, and the output shaft 304. The coupling of the protrusion(s) 515, 517 of the drive ring 504 with the stop(s) 706 of the cam 506 help to maintain the cam 506 in engagement with the output shaft 304 and enable rotational movement to be transferred between the drive ring 504 and the output shaft 304. Rotation of the output shaft 304 causes movement (e.g., pivoting) of the first drive arm 219 coupled to the output shaft 304 (FIGS. 2-4). Thus, the coupling between the drive ring 504, the cam 506, and the output shaft 304 enables the actuator 212 of the first drive subsystem 205 to control movement of the first drive arm 219 coupled to the output shaft 304 (FIGS. 2-6).

Figure 9:
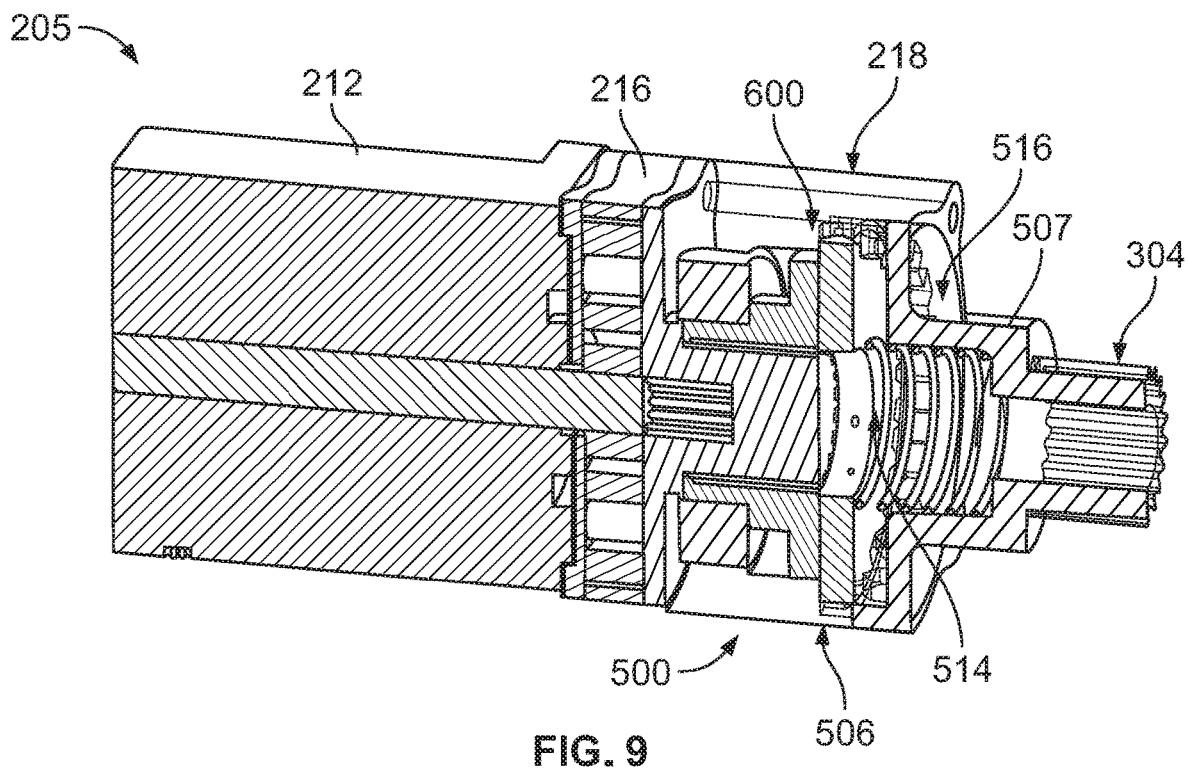
FIGS. 9 and 10 are cross-sectional views of the example first drive subsystem of FIGS. 3-4 including the coupler of FIGS. 5-8 taken along the A-A line of FIG. 4, where the first drive subsystem is shown in a first operational state in FIG. 9 and a second operational state in FIG. 10.
Figure 10:
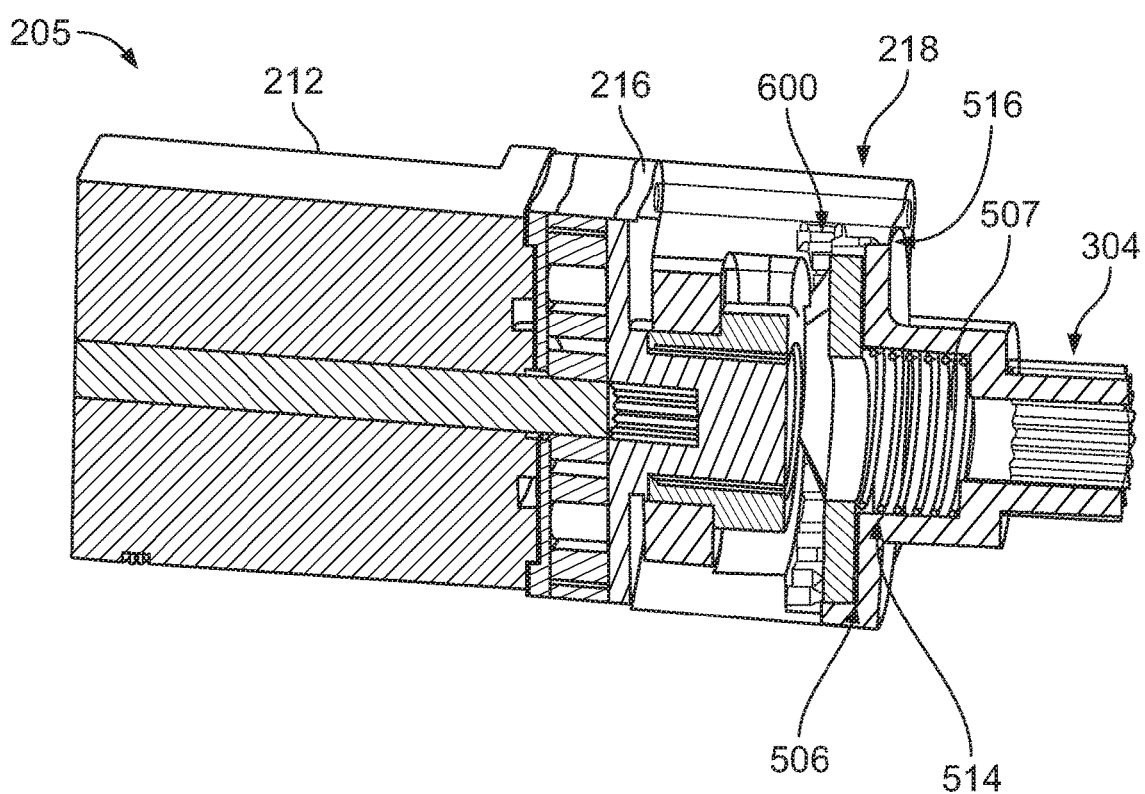

FIGS. 9 and 10 are cross-sectional views of the example first drive subsystem 205 taken along the A-A line of FIG. 4. In FIG. 9, the first drive subsystem 205 is in a first operational state in which the teeth 514 of the cam 506 are engaged with the teeth 600 of the housing 500. As shown in FIG. 9, the spring 507 is in an uncompressed or expanded position to help maintain the engagement between the teeth 514 of the cam 506 and the teeth 600 of the housing 500.

FIG. 10 illustrates the example first drive subsystem 205 in a second operational state in which the teeth 514 of the cam 506 are engaged with the teeth 516 of the output shaft 304. As disclosed above, the teeth 514 of the cam 506 move into engagement with the teeth 516 of the output shaft 304 via operation of the first actuator 212, which causes rotation of the cycloidal drive 216, rotation of the drive ring 504, and corresponding translation of the cam 506. As shown in FIG. 10, when the teeth 514 of the cam 506 are engaged with the teeth 516 of the output shaft 304, the spring 507 is in a compressed position due to the translational movement of the cam 506.

Referring generally to FIGS. 2-10, when the teeth 514 of the cam 506 of the example first drive subsystem 205 of FIGS. 2-10 are engaged with the teeth 516 of the output shaft 304, the first actuator 212 is operatively coupled to the first drive arm 219 and, thus, the first flap support linkage 208 of the flap 202. The first actuator 212 controls movement of the first flap support linkage 208 via the rotation of the drive ring 504, which causes corresponding rotation of the output shaft 304 due the coupling between the drive ring 504, the cam 506, and the output shaft 304. The rotation of the output shaft 304 drives movement of the first drive arm 219. Also, the second actuator 220 of the second drive subsystem 207 of the dual drive system 204 is operatively coupled to the second drive arm 225 in substantially the same manner as discussed in connection with the first drive subsystem 205. The actuators 212, 220 drive movement of the first flap support linkage 208 via the drive arms 219, 225 to raise or lower the flap 202 (i.e., in association with movement of the second flap support linkage 210 controlled by the second dual drive system 206).

When the flap 202 is in a stored position, the actuator(s) 212, 220, 226, 232 do not generate power to move the flap 202 (e.g., based on instruction(s) from the control surface controller 238). As such, the drive ring 504 of, for example, the first coupler 218 of the first drive subsystem 205 is no longer driven by the first actuator 212. Because the drive ring 504 is not rotating, the coupling between the teeth 514 of the cam 506 and the teeth 516 of the output shaft 304 is no longer maintained. As a result, the spring 507 expands and pushes against the cam 506, which causes the teeth 514 of the cam 506 to disengage from the teeth 516 of the of the output shaft 304 and to re-engage with the teeth 600 of the housing 500. As a result, the first actuator 212 is no longer operatively coupled to the first drive arm 219 and, thus, no longer operatively coupled to the first flap support linkage 208 of the flap 202.

The selective coupling between the cam 506 and the output shaft 304 can be used in the event of failure of the first actuator 212 or the first cycloidal drive 216 of the first drive subsystem 205. In particular, when the first actuator 212 and/or the first cycloidal drive 216 are in a failed state, the control surface controller 238 instructs the first actuator 212 to refrain from generating power. As a result, the first actuator 212 does not generate the power that would otherwise cause the drive ring 504 to facilitate the coupling between teeth 514 of the cam 506 and the teeth 516 of the output shaft 304. In such examples, because the teeth 514 of cam 506 are not engaged with the teeth 516 of the output shaft 304, the first drive arm 219 is not operatively coupled to the first actuator 212. Thus, the first drive arm 219 is free to be controlled by the second actuator 220 of the second drive subsystem 207 of FIG. 2. In particular, the first drive arm 219 is free to pivot in connection with the pivoting of the second drive arm 225 that is controlled by the second actuator 220 of the second drive subsystem 207 (i.e., due to the coupling of both drive arms 219, 225 to the first flap support linkage 208).

Thus, in the event of failure of the first actuator 212 and/or the first cycloidal drive 216, the actuator 212 of the first drive subsystem 205 is operatively isolated or separated from the first drive arm 219 and does not interfere with movement of the first flap support linkage 208. Asymmetries in the first drive subsystem 205 due to the failed actuator 212 and/or the failed cycloidal drive 216 are minimized because movement of the first drive arm 219 is not prevented by the failed actuator 212. Instead, because the teeth 514 of the cam 506 of the first coupler 218 are not engaged with the teeth 516 of the output shaft 304, the first drive arm 219 is not operatively coupled to the failed actuator 212. In some examples, the brake 310 (FIG. 3) of the first drive subsystem 205 may be activated (e.g., in response to an instruction by the control surface controller 238) in the event of failure of the first actuator 212 to provide a degree of resistance and improve control of movement of the first drive arm 219 via the corresponding movement of the second drive arm 225 of the second drive subsystem 207.

Further, because the first flap support linkage 208 can be controlled by the second actuator 220 of the second drive subsystem 207 in the event of failure of the first actuator 212 and/or the first cycloidal drive 216 of the first drive subsystem 205, skew at the flap 202 is prevented or substantially reduced as compared to if there was only one actuator controlling the first flap support linkage 208. In such cases, if the single actuator failed, the first flap support linkage 208 would not be actuated and skew would result between the portion of the flap 202 coupled to the first flap support linkage 208 and the portion of the flap 202 coupled to the second flap support linkage 210 that is actuated by operative or non-failed actuator(s). However, in examples disclosed herein, both flap support linkages 208, 210 are movable in the event of failure of one of the actuator(s) 212, 220 of the first dual drive system 204 and/or one of the actuator(s) 226, 232 of the second dual drive system 206 because the redundancy of actuators 212, 220, 226, 232 in the respective dual drive systems 204, 206.

FIGS. 11-15 illustrate example operational relationships between the first drive subsystem 205 and the second drive subsystem 207 during operation of the first actuator 212 (FIG. 2) of the first drive subsystem 205 and the second actuator 220 (FIG. 2) of the second drive subsystem 207. Although FIGS. 11-15 are discussed in connection with the first and second drive subsystems 205, 207 of the first dual drive system 204, the operational relationships between the third drive subsystem 209 and the fourth drive subsystem 213 can be substantially the same as the relationships between the first and second drive subsystems 205, 207 of the first dual drive system 204.

Also, for illustrative purposes, only the drive ring 504 and cam 506 of the first drive subsystem 205 are shown in FIGS. 11-15. Also, for illustrative purposes, only a drive ring 1100 and a cam 1102 of the second drive subsystem 207 are shown in FIGS. 11-15. In the examples of FIGS. 11-15, the drive ring 1110 and the cam 1102 of the second drive subsystem 207 are substantially the same as the drive ring 504 and the cam 506 of the first drive subsystem 205.

Figure 11:
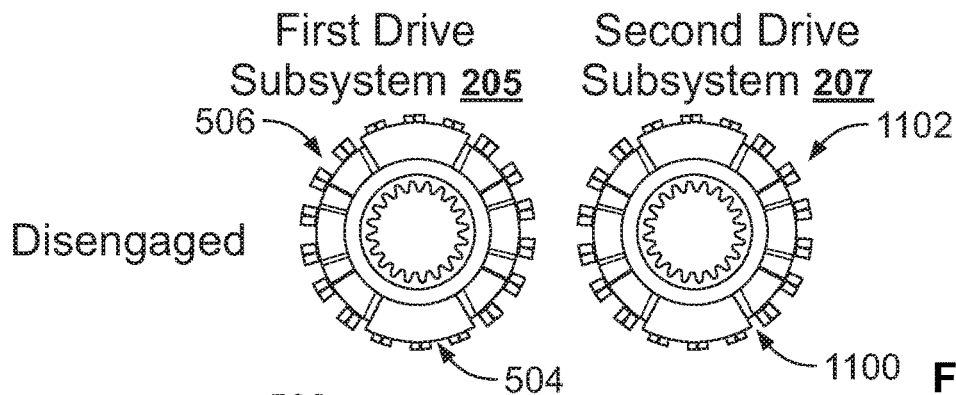
FIGS. 11-15 illustrate example states of the first drive subsystem of the first dual drive system of FIG. 2 and of a second drive subsystem of the first dual drive system of FIG. 2 in operation.

FIG. 11 illustrates the first drive subsystem 205 and the second drive subsystem 207 in the first operational state shown in FIG. 9. In the disengaged state, the teeth of the respective cams 506, 1102 of the drive subsystems 205, 207 (e.g., the teeth 514 of the cam 506 of FIGS. 5-10) are not engaged with the teeth of the output shaft of each drive subsystem 205, 207 (e.g., the teeth 516 of the output shaft 304 of FIGS. 5-6). Rather, the first and second drive subsystems 205, 207 are in the first operational state shown in the example of FIG. 9 (e.g., with the teeth 514 of the cam 506 in engagement with the teeth 600 of the housing 500 and the spring 507 in the expanded position).

Figure 12:
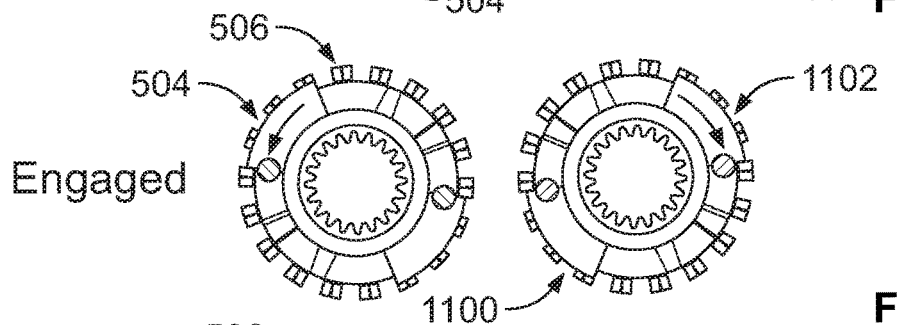

FIG. 12 illustrates each of the example first and second drive subsystems 205, 207 in the second operational state shown in FIG. 10. In this state, the teeth of the cam 506, 1102 of each drive subsystem 205, 207 are engaged with the teeth of the output shaft of each drive subsystem 205, 207 as shown in FIG. 10 (e.g., with the spring 507 in the compressed position).

Figure 13:
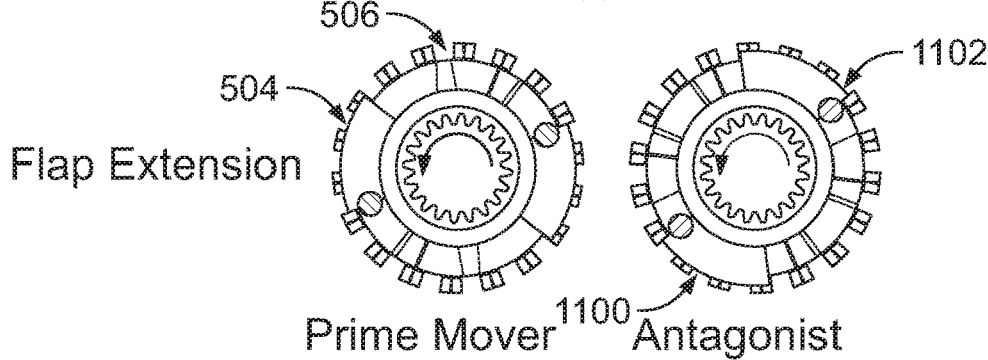

FIG. 13 illustrates operation of the first and second drive subsystems during extension of a flap (e.g., the flap 202 of FIG. 2). The flap can be extended during, for example, takeoff or landing. In operation, there may be a lag time between when the respective drive rings 504, 1100 are actuated by the cycloidal drives 216, 222 (FIG. 2) of each drive subsystem 205, 207 and when the cams 506, 1102 of the respective drive subsystems engage with the corresponding output shafts 304. During operation, the airload on the flap (e.g., the flap 202 of FIG. 2) may pull the flap back into the retracted position. Because of the lag time with respect to movement of the cam, the airload on the flap could cause the flap to move on its own if the actuators 212, 220 of the first dual drive system 204 were in the same rotational position during operation. To prevent such an effect, the respective actuators 212, 220 of the first and second drive subsystems 205, 207 operate in alternating agonist/antagonist roles. For example, during extension of the flap, the first actuator 212 is used to drive movement of the first flap support linkage 208 (FIG. 2) and, thus, acts as an agonist or prime mover to drive movement of the flap. In this example, the second actuator 220 of the second drive subsystem acts as an antagonist by providing an opposing torque that helps to control movement of the flap via the first flap support linkage 208. As a result of the opposite rotational arrangement of the actuators 212, 220, any tendency for the flap to move on its own due to airload is eliminated or substantially eliminated because of the generation of opposing torques. In other examples, the second actuator 220 of the second drive subsystem acts as the agonist or prime mover during extension of the flap.

Figure 14:
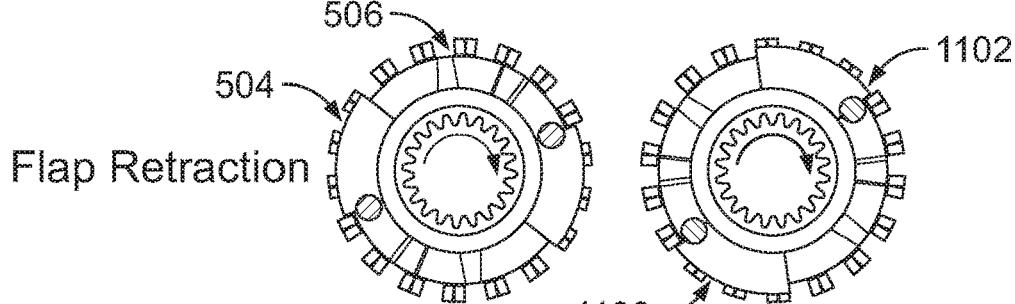

FIG. 14 illustrates operation the first and second drive subsystems during retraction of the flap. To reduce fatigue loads on the first actuator 212 of the first drive subsystem 205, the second actuator 220 of the second drive subsystem 207 serves as the prime mover or agonist to drive movement of the first flap support linkage 208 to cause the flap to move from an extended position to a retracted position. In this example, the first actuator 212 of the first drive subsystem 205 serves as the antagonist by providing an opposing torque that controls movement of the first flap support linkage 208 as disclosed above. In other examples, the first actuator 212 of the first drive subsystem 205 acts as the agonist or prime mover during retraction of the flap.

Figure 15:
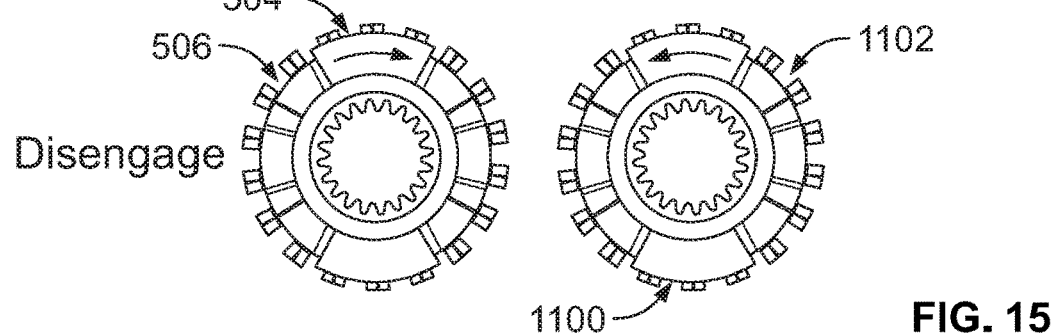

FIG. 15 illustrates the first and second drive subsystems 205, 207 in the disengaged state in which the teeth of the cams 506, 1102 are not engaged with the teeth of the output shafts of the respective first and second drive subsystems 205, 207. The first and second drive subsystems 205, 207 return to the first operational state shown in the example of FIG. 9 (i.e., where the teeth 514 of the cam 506 are in engagement with the teeth 600 of the housing 500 and the spring 507 is in the expanded position). The first and second drive subsystems 205, 207 can return to the first operational state during, for example, the cruise stage of the aircraft.

As disclosed herein, in the event of failure of, for instance, the first actuator 212 of the first drive subsystem 205, the first actuator 212 no longer generates power. Thus, the cam 506 of the first drive subsystem 205 does not engage with the output shaft 304 of the first drive subsystem 205. In such examples, the second actuator 220 of the second drive subsystem 207 controls operation of the flap during extension and/or retraction of the flap. As such, in the examples of FIGS. 11-15, the first drive subsystem 205 would remain in the first operational state of FIG. 11. The second drive subsystem 207 would move to the second operational state shown in FIGS. 12-14 to extend and retract the flap via the operative coupling between the second actuator 220 of the second drive subsystem 207 and the second drive arm 225.

Conversely, in the event of failure of the second actuator 220 of the second drive subsystem 207, the second actuator 220 no longer generates power. As such, the cam 1102 of the second drive subsystem 207 does not engage with the output shaft of the second drive subsystem 207 and the second drive subsystem 207 would remain in the first operational state of FIG. 11. In such examples, the first actuator 212 of the first drive subsystem 205 controls operation of the flap during extension and/or retraction of the flap. The first drive subsystem 205 would move to the second operational state shown in FIGS. 12-14 to extend and retract the flap via the operative coupling between the actuator 212 of the second drive subsystem 207 and the second drive arm 225.

Although FIGS. 3-15 are primarily discussed in connection with the example first drive subsystem 205 of FIG. 2, examples disclosed herein can apply to any of the second, third, and/or fourth drive subsystems 207, 209, 213 of the first and/or second dual drive systems 204, 206.

Figure 16:
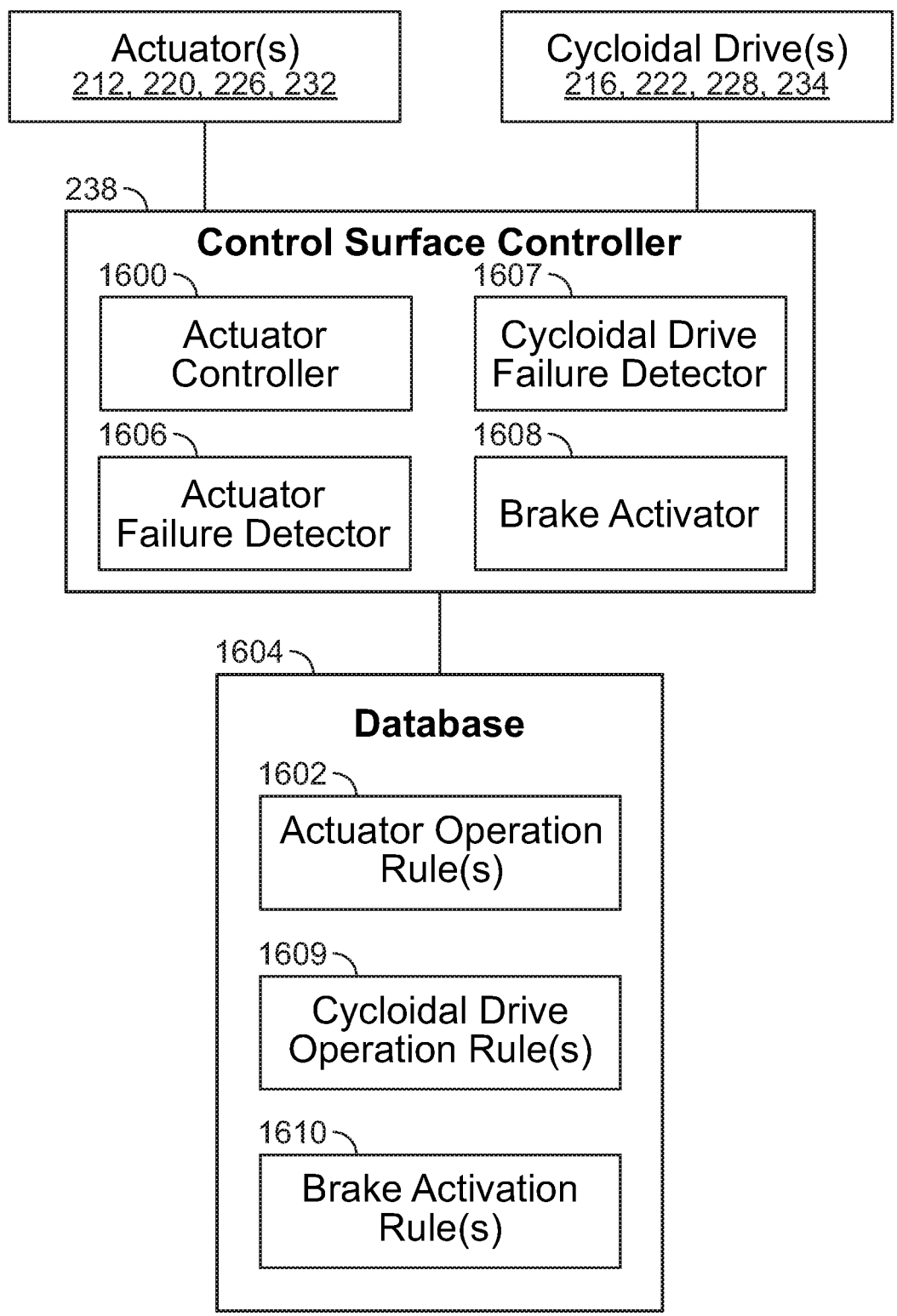
FIG. 16 is a block diagram of an example implementation of the control surface controller of FIG. 2.

FIG. 16 is a block diagram of an example implementation of the control surface controller 238 of FIG. 2. As mentioned above, the control surface controller 238 is constructed to generate instruction(s) that are transmitted to the actuator(s) 212, 220, 226, 232 of the drive subsystems 205, 207, 209, 213 of the example dual drive systems 204, 206 of FIG. 2 to control movement of the flap 202. In the example of FIG. 16, the control surface controller 238 is implemented by one or more processors (e.g., processor(s) on-board the aircraft including the flap 202) and/or cloud-based device(s) (e.g., server(s), processor(s), and/or virtual machine(s)).

The example control surface controller 238 includes an actuator controller 1600. The actuator controller 1600 of FIG. 16 provides means for controlling operation of the actuator(s) 212, 220, 226, 232 of the drive subsystems 205, 207, 209, 213 of the example dual drive systems 204, 206 of FIGS. 2-15. For example, the actuator controller 1600 generates instructions that cause the actuators to generate power that is used to drive movement of the flap 202 between a stored position and an extended position. In some examples, the actuator controller 1600 instructs the actuator(s) 212, 220, 226, 232 to generate power based on user input(s) received at flight control system(s) in communication with the control surface controller 238. The user input(s) can include instructions for the flap 202 to move to a particular position. In some examples, the actuator controller 1600 instructs the actuator(s) 212, 220, 226, 232 to refrain from generating power when, for example, the flap 202 is in the stored position. In some examples, the actuator controller 1600 of FIG. 16 controls operation of the actuator(s) 212, 220, 226, 232 with respect to which actuator(s) 212, 220, 226, 232 within a particular drive subsystem 205, 207, 209, 213 operate as the prime mover during movement of the flap 202 and which actuator(s) 212, 220, 226, 232 act as the antagonist.

The actuator controller 1600 of the example control surface controller 238 of FIG. 16 controls operation of the actuator(s) 212, 220, 226, 232 based on one or more actuator operation rule(s) 1602. The actuator operation rule(s) 1602 can be defined by one or more user inputs and stored in a database 1604. In some examples, the example control surface controller 238 includes the database 1604. In other examples, the database 1604 is located external to the control surface controller 238 in a location accessible to the controller, as shown in FIG. 16.

The example control surface controller 238 of FIG. 16 includes an actuator failure detector 1606. The actuator failure detector 1606 detects a failure state at respective ones of the actuator(s) 212, 220, 226, 232 based on data generated by, for instance, sensor(s) of the actuator(s) 212, 220, 226, 232. For example, if an output of a sensor of a particular actuator 212, 220, 226, 232 does not satisfy a threshold value or if an output value of the sensor does not change within a threshold period of time, the actuator failure detector 1606 detects a failure condition at that actuator 212, 220, 226, 232. The actuator failure detector 1606 can determine that the actuator(s) 212, 220, 226, 232 are in a failed state based on the actuator operation rule(s) 1602 stored in the database 1604. The actuator operation rule(s) 1602 can define expected output(s) for the actuator(s) 212, 220, 226, 232 that are used by the actuator failure detector 1606 to determine that the actuator(s) 212, 220, 226, 232 are in a failed state (e.g., based on comparison(s) of actual output(s) of the actuator(s) 212, 220, 226, 232 to expected output(s)).

In the example of FIG. 16, if the actuator failure detector 1606 detects that one or more of the actuators 212, 220, 226, 232 have failed, the actuator failure detector 1606 communicates the failed state of the actuator(s) 212, 220, 226, 232 to the actuator controller 1600. In response, the actuator controller 1600 prevents the failed actuator(s) 212, 220, 226, 232 from generating power (e.g., by instructing the failed actuator(s) 212, 220, 226, 232 to power down, refraining from activating the actuator(s) 212, 220, 226, 232 if the actuator(s) 212, 220, 226, 232 are already powered down, etc.). As a result, because the failed actuator(s) 212, 220, 226, 232 do not generate power, the cam of the 506 of the first coupler 218 of the respective drive subsystems 205, 207, 209, 213 does not engage with the corresponding output shaft 304 of the drive subsystems 205, 207, 209, 213. Thus, the first drive arm 219 of the respective drive subsystems 205, 207, 209, 213 including the failed actuator 212, 220, 226, 232 is free to be actuated via the other (non-failed) actuator 212, 220, 226, 232 of the corresponding dual drive system 204, 206, as disclosed herein.

The example control surface controller 238 of FIG. 16 includes a cycloidal drive failure detector 1607. The cycloidal drive failure detector 1607 detects a failure state at one or more of the cycloidal drive(s) 216, 222, 228, 234 based on, for example, one or more cycloidal drive operation rule(s) 1609 stored in the database 1604 and data generated by sensor(s) associated with the cycloidal drive(s) 216, 222, 228, 234 and/or the sensor(s) associated with the corresponding actuator(s) 212, 220, 226, 232. The cycloidal drive operation rule(s) 1609 can be defined by user input(s) and include expected speeds and/or positions of the cycloidal drive(s) 216, 222, 228, 234 during operation.

In the example of FIG. 16, if the cycloidal drive failure detector 1607 detects that one or more of the cycloidal drive(s) 216, 222, 228, 234 have failed, the cycloidal drive failure detector 1607 communicates the failed state of the cycloidal drive(s) 216, 222, 228, 234 to the actuator controller 1600. In response, the actuator controller 1600 prevents the actuator(s) 212, 220, 226, 232 associated with the failed cycloidal drive(s) 216, 222, 228, 234 from generating power (e.g., by instructing the actuator(s) 212, 220, 226, 232 to power down, refraining from activating the actuator(s) 212, 220, 226, 232, etc.). As a result, because the actuator(s) 212, 220, 226, 232 do not generate power, the failed cycloidal drive 216, 222, 228, 234 does not rotate and, thus, does not drive movement of the drive ring 504. Therefore, the cam 506 of the first coupler 218 of the respective drive subsystems 205, 207, 209, 213 does not engage with the output shaft 304 of the drive subsystems 205, 207, 209, 213. Thus, the first drive arm 219 of the respective drive subsystems 205, 207, 209, 213 including the failed cycloidal drive 216, 222, 228, 234 is free to be actuated via the other actuator 212, 220, 226, 232 of the corresponding dual drive system 204, 206, as disclosed herein.

The example control surface controller 238 of FIG. 16 includes a brake activator 1608. The brake activator 1608 provides means for controlling the activation or the release of the brake 310 of the respective drive subsystems 205, 207, 209, 213. In some examples, the brake activator 1608 generates instructions that cause the brake 310 to move from a released position to an activated position to support the first drive arm 219 when the flap 202 is in, for example, a raised position and to lock the first drive arm 219 and, thus, the flap 202 into a particular position. In some examples, the brake activator 1608 generates instructions that cause the brake 310 to move from the activated position to a released position during, for instance, movement of the flap from the raised position to a retracted or stored position. The brake activator 1608 controls the brake 310 based on one or more brake activation rule(s) 1610 defined by user input(s) and stored in the database 1604.

In some examples, the brake activator 1608 instructs the brake 310 of a particular drive subsystem 205, 207, 209, 213 to move from a released position to an activated position when the actuator failure detector 1606 detects that one of the actuators 212, 220, 226, 232 of the drive subsystem 205, 207, 209, 213 has failed and/or when the cycloidal drive failure detector 1607 detects that one of the cycloidal drives 216, 222, 228, 234 has failed. In such examples, activating the brake 310 of the drive subsystem 205, 207, 209, 213 including the failed actuator 212, 220, 226, 232 and/or the failed cycloidal drive 216, 222, 228, 234 provides for a degree of resistance and control of the first drive arm 219 of the drive subsystem 205, 207, 209, 213 when the first drive arm 219 is actuated via the other actuator 212, 220, 226, 232 of the dual drive system 204, 206.

While an example manner of implementing the control surface controller 238 of FIG. 2 is illustrated in FIG. 16, one or more of the elements, processes and/or devices illustrated in FIG. 16 may be combined, divided, re-arranged, omitted, eliminated and/or implemented in any other way. Further, the example actuator controller 1600, the example database 1604, the example actuator failure detector 1606, the example cycloidal drive failure detector 1607, the example brake activator 1608 and/or, more generally, the example control surface controller 238 of FIG. 16 may be implemented by hardware, software, firmware and/or any combination of hardware, software and/or firmware. Thus, for example, any of the example actuator controller 1600, the example database 1604, the example actuator failure detector 1606, the example cycloidal drive failure detector 1607, the example brake activator 1608 and/or, more generally, the example control surface controller 238 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example actuator controller 1600, the example database 1604, the example actuator failure detector 1606, the example cycloidal drive failure detector 1607, and/or the example brake activator 1608 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control surface controller 238 of FIG. 16 may include one or more elements, processes and/or devices in addition to, or instead of, those illustrated in FIG. 16, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 17:
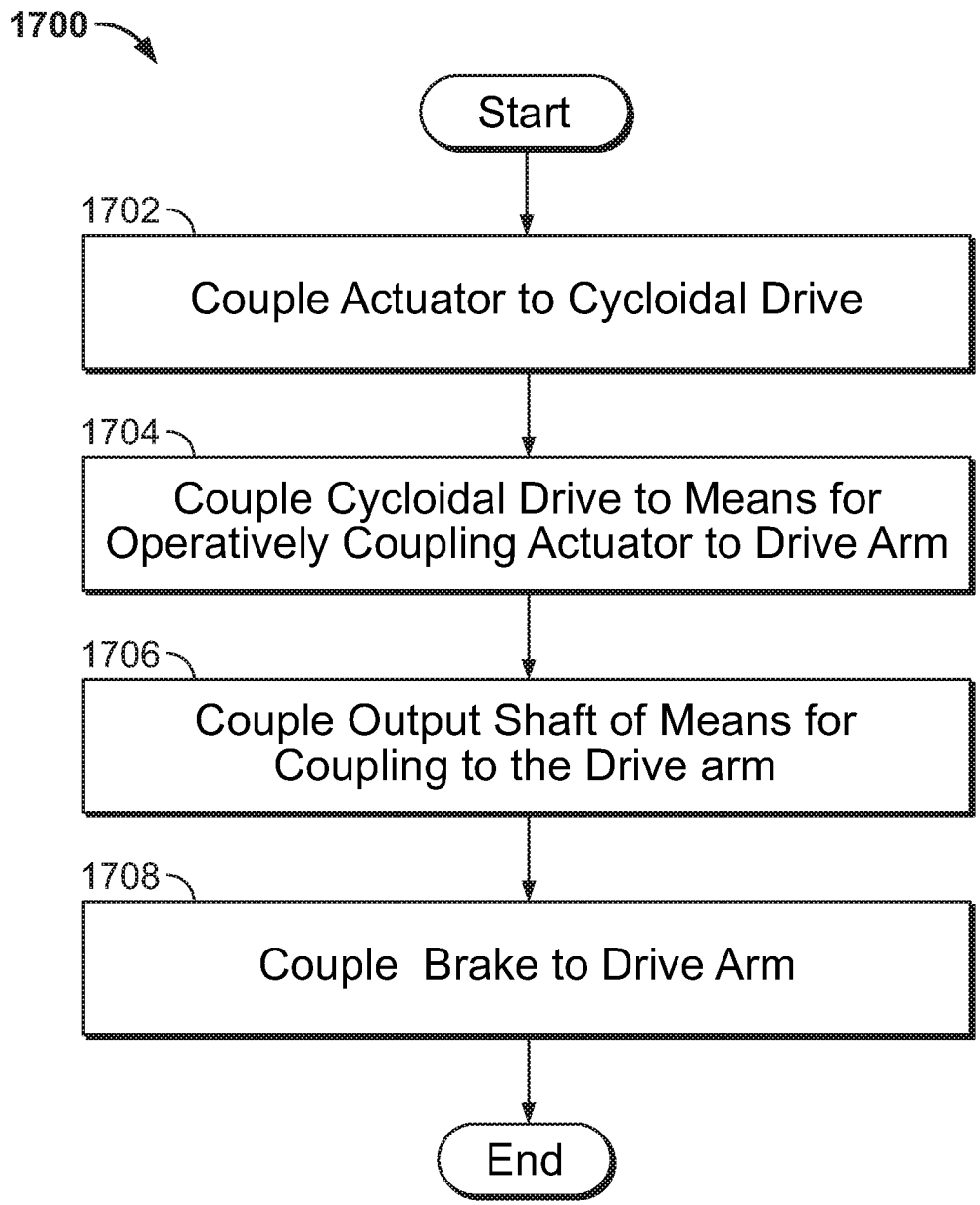
FIG. 17 is a flowchart representative of an example method of assembling a control surface drive system in accordance with teachings of this disclosure.

FIG. 17 is a flowchart of an example method for assembling a drive subsystem (e.g., the drive subsystem 205, 207, 209, 213 of FIG. 2) of a dual drive system (e.g., the dual drive system 204, 206 of FIG. 2) for actuating a control surface (e.g., the flap 202 of FIG. 2) of an air vehicle in accordance with teachings of this disclosure. The example method 1700 begins with coupling an actuator to a cycloidal drive (block 1702). For example, the actuator 212 of FIGS. 2-5 is coupled to the cycloidal drive 216 via the output shaft 300 of the actuator 212.

The example method 1700 includes coupling means for operatively coupling the actuator to a drive arm of the drive subsystem to the cycloidal drive (block 1704). For example, the first coupler 218 of FIGS. 2-10 is coupled to the cycloidal drive 216 via the output shaft 302 of the cycloidal drive 216. In this example, the output shaft 302 of the cycloidal drive 216 extends through an opening 508 in the housing 500 of the first coupler 218. The output shaft 302 of the cycloidal drive 216 couples with the drive ring 504 of the first coupler 218. In particular, the teeth of the output shaft 302 of the cycloidal drive 216 engage with the teeth 512 of the drive ring 504 to operatively couple the actuator 212 to the first coupler 218.

The example method 1700 includes coupling an output shaft of the means for operatively coupling to a drive arm of the drive subsystem (block 1706). For example, the output shaft 304 of the first coupler 218 is coupled to first drive arm 219 of the example drive subsystem 205 of FIG. 2. In some examples, the output shaft 304 extends through an opening 306 in the rib 308 of first drive subsystem 205 to couple with the first drive arm 219.

The example method 1700 includes coupling a brake to the drive arm (block 1708). For example, the brake 310 of FIGS. 3 and 4 is coupled to the first drive arm 219 to lock the first drive arm 219 in a particular position.

Although the example method 1700 is described with reference to the flowchart illustrated in FIG. 17, many other methods of assembling a drive subsystem of a dual drive system may alternatively be used. For example, the order of execution of the blocks may be changed, and/or some of the blocks described may be changed, eliminated, or combined. Similarly, additional operations may be included in the example method of FIG. 17 before, in between, or after the blocks shown in FIG. 17.

Figure 18:
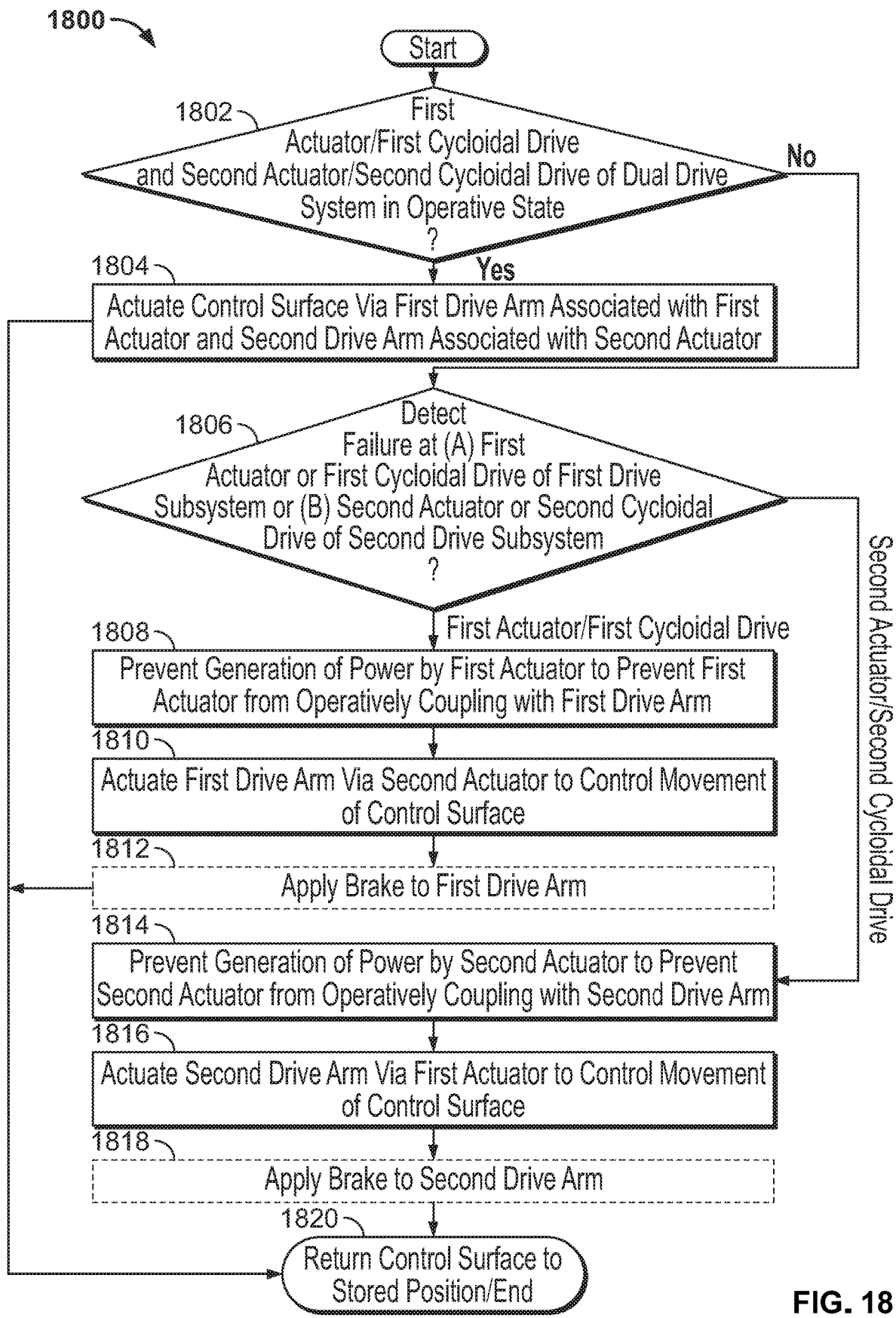
FIG. 18 is a flowchart representative of example machine readable instructions that may be executed to implement the example control surface controller of FIGS. 2 and/or 16.

A flowchart representative of example hardware logic, machine readable instructions, hardware implemented state machines, and/or any combination thereof for implementing the control surface controller 238 of FIGS. 2 and/or 17 is shown in FIG. 18. The machine readable instructions may be one or more executable programs or portion(s) of an executable program for execution by a computer processor such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart illustrated in FIG. 19, many other methods of implementing the example control surface controller 238 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a FPGA (field-programmable gate array), an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 19 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 18 is a flowchart of an example method 1800 to control the selective, operative coupling of actuators (e.g., the actuators 212, 220, 226, 232 of FIG. 2) of a dual drive system (e.g., the dual drive system 204, 206 of FIG. 2) to corresponding drive arms (e.g., the drive arms 219, 225, 231, 237 of FIG. 2) for controlling actuation of a control surface (e.g., the flap 202) of an air vehicle. The example method 1800 can be implemented by the example control surface controller 238 of FIGS. 2 and/or 16.

The example method 1800 begins with identifying that a first actuator and associated first cycloidal drive of the dual drive system and a second actuator and associated second cycloidal drive of the dual drive system are operative state and there are no failure conditions (block 1802). For example, the actuator failure detector 1606 of the control surface controller 238 confirms that the first and second actuators 212, 220 of the first drive subsystem 205 are both operative based on data received from the actuator(s) 212, 220 (e.g., sensor data) and the actuator operation rule(s) 1602 stored in the database 1604. The cycloidal drive failure detector 1607 of the control surface controller 238 confirms that the first cycloidal drive 216 associated with the first actuator 212 and the second cycloidal drive 222 associated with the second actuator 220 are both operative based on data received from the cycloidal drive(s) 216, 222 and/or the actuator(s) 212, 220 and the cycloidal drive operation rule(s) 1609 stored in the database 1604.

When both actuators and corresponding cycloidal drives of the dual drive system are in an operative state, the actuators are used to actuate the control surface of the air vehicle via the corresponding drive arms (block 1804). For example, the actuator controller 1600 of the control surface controller 238 instructs the actuators 212, 220 of the first dual drive subsystem 205 to generate power to move the drive arms 219, 225 and, thus, the flap 202 based on the actuator operation rule(s) 1602. When the first actuator 212 is operative, power from the first actuator 212 drives the cam 506 of the first coupler 218 of the first drive subsystem 205 from the first position in which the teeth 514 of the cam 506 engage the teeth 600 of the housing 500 to the second position in which the teeth 514 of the cam 506 engage the teeth 516 of the output shaft 304 (e.g., via movement of the cycloidal drive 216 and the drive ring 504). As a result of the engagement of the teeth 514 of the cam 506 with the teeth 516 of the output shaft 304, the first actuator 212 is operatively coupled to the first drive arm 219. Similarly, power generated by the second actuator 220 is used to drive the cam of the coupler 224 of the second drive subsystem 207 into engagement with the output shaft of the second drive subsystem 207 to operatively couple the second actuator 220 to the second drive arm 225. In some examples, the actuator operation rule(s) 1602 determine which of the actuators 212, 220 are to operate as the prime mover during movement of the flap 202 and which of the actuators 212, 220 are to act as the antagonist during movement of the flap 202.

In some examples, the brake activator 1608 activates the respective brakes associated with the drive arms 219, 225 (e.g., the brake 310) to lock the drive arms 219, 225 and. thus, the flap 202 in a particular position.

In some examples of the method 1800, a failure condition is detected at (a) the first actuator or the first cycloidal drive of the first drive subsystem of the dual drive system or (b) the second actuator or the second cycloidal drive of the second drive subsystem of the dual drive system (block 1806). For example, the actuator failure detector 1606 of the example control surface controller 238 of FIG. 16 can determine that the first actuator 212 of the first drive subsystem 205 or the second actuator 220 of the second drive subsystem 207 is in a failed state (e.g., based on outputs received from the respective actuator(s)). In other examples, the cycloidal drive failure detector 1607 of the example control surface controller 238 of FIG. 16 determines that the first cycloidal drive 216 of the first drive subsystem 205 or the second cycloidal drive 222 of the second drive subsystem 207 is in a failed state (e.g., based on sensor data generated for the respective cycloidal drives 216, 222), If a failure state is detected at block 1806, the example method 1800 includes preventing the operative coupling between the actuator of the drive subsystem associated with the failure condition and the corresponding drive arm associated with the drive subsystem. For example, if the failure condition is associated with the first actuator or the first cycloidal drive of the first drive subsystem, the example method 1800 includes preventing the generation of power by the first actuator to prevent the operative coupling between the first actuator and the first drive arm (block 1808). For example, the actuator controller 1600 of the control surface controller 238 prevents the first actuator 212 from generating power. As a result, the cycloidal drive 216 does not drive the drive ring 504 of the first coupler 218. Thus, the cam 506 remains in the first position in which the teeth 514 of the cam 506 are engaged with the teeth 600 of the housing 500 and is not driven by the drive ring 504 to engage with the teeth 516 of the output shaft 304. As such, the first actuator 212 does not operatively couple with the first drive arm 219.

In such examples, the method 1800 includes actuating the first drive arm via the second actuator of the second drive subsystem (block 1810). For example, the second actuator 220 drives movement of the second drive arm 225, which is coupled to the first flap support linkage 208. Because the first drive arm 219 is not operatively coupled to the first actuator 212, the first drive arm 219 also moves as a result of movement of the second drive arm 225 and the coupling of the first drive arm 219 to the first flap support linkage 208.

In such some examples, the method 1800 includes applying a brake associated with the first drive arm (block 1812). For example, the brake activator 1608 activates the brake 310 of the first drive arm 219 to facilitate control of the movement of the first drive arm 219 via the second actuator 220.

In the example of FIG. 18, if the failure is detected at the second actuator or the second cycloidal drive of the second drive subsystem (block 1806), the example method 1800 includes preventing the generation of power by the second actuator to prevent the operative coupling between the second actuator and the second drive arm. For example, the actuator controller 1600 prevents the second actuator 220 from generating power and, thus, prevents the second actuator 220 from operatively coupling to the second drive arm 225 via the second cycloidal drive 222 and the first coupler 218 of the second drive subsystem 207 (block 1814).

In such examples, the method 1800 includes actuating the second drive arm via the first actuator of the first drive subsystem (block 1816). For example, the second drive arm 225 pivots during actuation of the first drive arm 219 by the first actuator 212 and resulting movement of the first flap support linkage 208. In some such examples, the method 1800 includes applying a brake associated with the second drive arm (block 1818). For example, the brake activator 1608 activates the brake 310 of the second drive arm 225 to facilitate control of the movement of the second drive arm 225 via the first actuator 212.

The example method 1800 of FIG. 18 ends when the control surface is returned to its stored position (block 1820).

Figure 19:
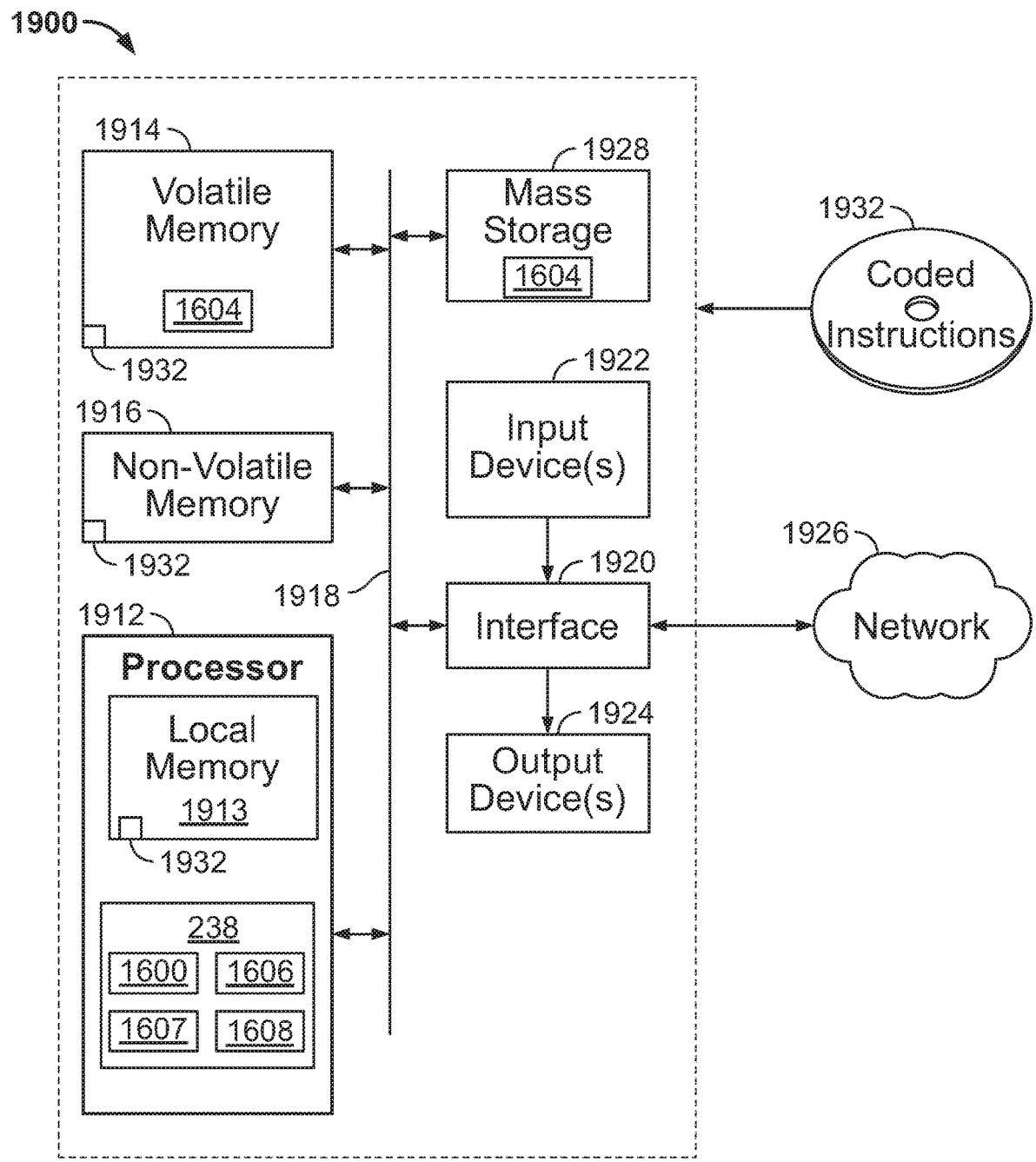
FIG. 19 is a block diagram of an example processing platform structured to execute the instructions of FIG. 18 to implement the example control surface controller of FIGS. 2 and/or 16.

FIG. 19 is a block diagram of an example processor platform 1900 structured to execute the instructions of FIG. 19 to implement the control surface controller 238 of FIGS. 2 and/or 16. The processor platform 1900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example actuator controller 1600, the example actuator failure detector 1606, the example cycloidal drive failure detector 1607, and the example brake activator 1608.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI (peripheral component interconnect) express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

Coded instructions 1932 of FIG. 19 may be stored in the mass storage device 1928, in the volatile memory 1914, in the non-volatile memory 1916, and/or on a removable non-transitory computer readable storage medium such as a CD or DVD.

From the foregoing, it will be appreciated that example methods, apparatus and articles of manufacture have been disclosed that provide for selective, operative coupling between an actuator of a dual drive system and mechanical linkages for actuating a control surface of an air vehicle. Example dual drive systems disclosed herein provide for redundancy in the event of failure of one of the actuators of the drive system to enable the control surface to be actuated despite the failure condition and to reduce skew at the control surface. Examples disclosed herein include a coupler that selectively couples an actuator of the dual drive system to a corresponding drive arm of the dual drive system. In the event of failure of the actuator, the coupler prevents the operative coupling between the actuator and the corresponding drive arm. As a result, the drive arm is able to be actuated via the other actuator of the dual drive system. Thus, example disclosed herein prevent or substantially reduce asymmetries in the dual drive system in the event of a failure condition at the dual drive system.

The following paragraphs provide various examples of the examples disclosed herein.

Example 1 includes a flap actuation system includes a first actuator, a second actuator, a first drive arm coupled to the first actuator and to a flap, a second drive arm coupled to the second actuator and to the flap, a first cam, and a first output shaft. The first cam is to couple with the first drive arm via the first output shaft during operation of the first actuator to enable the first actuator to actuate the flap via the first drive arm. The example flap actuation system includes a second cam and a second output shaft. The second cam is to couple to the second drive arm via the second output shaft during operation of the second actuator to enable the second actuator to actuate the flap via the second drive arm. The first cam is to be uncoupled from the first drive arm in response to a failure of the first actuator. The second actuator is to actuate the flap via the first drive arm and the second drive arm in response to the failure of the first actuator.

Example 2 includes the flap actuation system of example 1, further including a cycloidal drive disposed between the first actuator and the first cam, the cycloidal drive to rotate to enable the first cam to couple with the first drive arm.

Example 3 includes the flap actuation system of example 2, wherein the first cam includes a first set of teeth, the first output shaft includes a second set of teeth, and further including a housing including a third set of teeth, the first cam disposed between the housing and the first output shaft, the first cam to move via the first actuator from a first position in which the first set of teeth of the first cam engage the third set of teeth of the housing to a second position in which the first set of teeth of the first cam engage the second set of teeth of the first output shaft.

Example 4 includes the flap actuation system of example 3, further including a drive ring coupled to a shaft of the cycloidal drive, the drive ring to rotate to cause translation of the first cam between the first position and the second position.

Example 5 includes the flap actuation system of any of examples 1-4, wherein the first drive arm includes a brake, the brake to be activated in response to the failure of the first actuator.

Example 6 includes the flap actuation system of example 1, wherein during operation of the first actuator and the second actuator, the first actuator is to actuate of the flap from a first position to a second position and the second actuator is to actuate the flap from the second position to the first position, the first cam to be coupled with the first drive arm and the second cam to be coupled with the second drive arm when the first actuator actuates the flap and when the second actuator actuates the flap, respectively.

Example 7 includes the flap actuation system of example 6, wherein the first position includes an extended position and the second position includes a retracted position.

Example 8 includes an aircraft including a flap, a first actuator, a second actuator, a first drive arm coupled to the flap, a second drive arm coupled to the flap, a first coupler to selectively couple the first actuator to the flap via the first drive arm, and a second coupler to selectively couple the second actuator to the flap via the second drive arm.

Example 9 includes the aircraft of example 8, further including a cycloidal drive disposed between the first actuator and the first coupler.

Example 10 includes the aircraft of example 9, wherein the first actuator is to cause the cycloidal drive to rotate to enable the first coupler to couple with the first drive arm.

Example 11 includes the aircraft of example 10, wherein the first coupler includes a spring to move between an extended position and a compressed position in response to the first coupler selectively coupling the first actuator to the flap via the first drive arm.

Example 12 includes the aircraft of any of examples 8-11, wherein the first coupler includes a housing; a cam disposed in the housing; and an output shaft, the output shaft coupled to the first drive arm, the cam to move between a first position in which teeth of the cam are engaged with teeth of the housing to a second position in which the teeth of the cam are engaged with teeth of the output shaft to selectively couple the first actuator to the flap.

Example 13 includes the aircraft of any of examples 8-11, wherein the first drive arm and the second drive arm are coupled to a first flap support and further including: a third actuator; a fourth actuator; a third drive arm coupled to the flap; a fourth drive arm coupled to the flap; a third coupler to selectively couple the third actuator to the flap via the third drive arm; and a fourth coupler to selectively couple the fourth actuator to the flap via the fourth drive arm.

Example 14 includes the aircraft of example 13, further including a controller to instruct (a) one of the first actuator or the second actuator to cause the flap to move between an extended position and a retracted position and (b) one of the third actuator or the fourth actuator to cause the flap to move between the extended position and the retracted position.

Example 15 includes a system including a first actuator, a second actuator, a drive arm coupled to a flap of a vehicle, a coupler disposed between the first actuator and the drive arm. The coupler includes a cam. The cam is to selectively couple with the drive arm to operatively couple the first actuator to the drive arm. The example system includes a controller to control the operative coupling of the first actuator to the drive arm via the coupler. The controller is to command the second actuator to drive movement of the flap when the cam is uncoupled from the drive arm.

Example 16 includes the system of example 15, wherein the controller is to command the second actuator to drive movement of the flap in response to a failure of the first actuator.

Example 17 includes the system of examples 15 or 16, further including a cycloidal drive, the cam to couple with the drive arm in response to rotation of the cycloidal drive.

Example 18 includes the system of the example 17, wherein the cam includes a first set of teeth and the coupler further includes a housing including a second set of teeth and an output shaft including a third set of teeth, the cam to move from a first position in which the first set of teeth of the cam engage the second set of teeth of the housing to a second position in which the first set of teeth of the cam engage the third set of teeth of the output shaft.

Example 19 includes the system of example 18, wherein a shaft of the cycloidal drive is to extend through the housing.

Example 20 includes the system of any of examples 15-19, further including a brake coupled to the drive arm, the controller to activate the brake in response to a failure of the first actuator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate example of the present disclosure.

What is claimed is:

1. A flap actuation system comprising:
    a first actuator;
    a second actuator;
    a first drive arm coupled to the first actuator and to a flap;
    a second drive arm coupled to the second actuator and to the flap;
    a first cam;
    a first output shaft, the first cam to couple to the first drive arm via the first output shaft during operation of the first actuator to enable the first actuator to actuate the flap via the first drive arm;
    a second cam; and
    a second output shaft, the second cam to couple to the second drive arm via the second output shaft during operation of the second actuator to enable the second actuator to actuate the flap via the second drive arm, the first cam uncoupled from the first drive arm in response to a failure of the first actuator, the second actuator to actuate the flap via the first drive arm and the second drive arm in response to the failure of the first actuator.

2. The flap actuation system of claim 1, further including a cycloidal drive disposed between the first actuator and the first cam, the cycloidal drive to rotate to enable the first cam to couple with the first drive arm.

3. The flap actuation system of claim 2, wherein the first cam includes a first set of teeth, the first output shaft includes a second set of teeth, and further including:
    a housing including a third set of teeth, the first cam disposed between the housing and the first output shaft, the first cam to move via the first actuator from a first position in which the first set of teeth of the first cam engage the third set of teeth of the housing to a second position in which the first set of teeth of the first cam engage the second set of teeth of the first output shaft.

4. The flap actuation system of claim 3, further including a drive ring coupled to a shaft of the cycloidal drive, the drive ring to rotate to cause translation of the first cam between the first position and the second position.

5. The flap actuation system of claim 1, wherein the first drive arm includes a brake, the brake to be activated in response to the failure of the first actuator.

6. The flap actuation system of claim 1, wherein during operation of the first actuator and the second actuator, the first actuator is to actuate the flap from a first position to a second position and the second actuator is to actuate the flap from the second position to the first position, the first cam to be coupled with the first drive arm and the second cam to be coupled with the second drive arm when the first actuator actuates the flap and when the second actuator actuates the flap, respectively.

7. The flap actuation system of claim 6, wherein the first position includes an extended position and the second position includes a retracted position.

8. An aircraft comprising:
    a flap;
    a first actuator;
    a second actuator;
    a first drive arm coupled to the flap;
    a second drive arm coupled to the flap;
    a first coupler to selectively couple the first actuator to the flap via the first drive arm;
    a second coupler to selectively couple the second actuator to the flap via the second drive arm; and
    a cycloidal drive disposed between the first actuator and the first coupler, the first actuator is to cause the cycloidal drive to rotate to enable the first coupler to couple with the first drive arm, the first coupler including a spring to move between an extended position and a compressed position in response to the first coupler selectively coupling the first actuator to the flap via the first drive arm.

9. An aircraft comprising:
    a flap;
    a first actuator;
    a second actuator;
    a first drive arm coupled to the flap;
    a second drive arm coupled to the flap;
    a first coupler to selectively couple the first actuator to the flap via the first drive arm the first coupler including:
       a housing;
       a cam disposed in the housing; and
       an output shaft, the output shaft coupled to the first drive arm, the cam to move between a first position in which teeth of the cam are engaged with teeth of the housing to a second position in which the teeth of the cam are engaged with teeth of the output shaft to selectively couple the first actuator to the flap; and
    a second coupler to selectively couple the second actuator to the flap via the second drive arm.

10. The aircraft of claim 9, wherein the first drive arm and the second drive arm are coupled to a first flap support and further including:
    a third actuator;
    a fourth actuator;
    a third drive arm coupled to the flap;
    a fourth drive arm coupled to the flap;
    a third coupler to selectively couple the third actuator to the flap via the third drive arm; and
    a fourth coupler to selectively couple the fourth actuator to the flap via the fourth drive arm.

11. The aircraft of claim 10, further including a controller to instruct (a) one of the first actuator or the second actuator to cause the flap to move between an extended position and a retracted position and (b) one of the third actuator or the fourth actuator to cause the flap to move between the extended position and the retracted position.

12. A system comprising:
    a first actuator;
    a second actuator;
    a drive arm coupled to a flap of a vehicle;
    a coupler disposed between the first actuator and the drive arm, the coupler including a cam, the cam to selectively couple with the drive arm to operatively couple the first actuator to the drive arm; and a controller to control the operative coupling of the first actuator to the drive arm via the coupler, the controller to command the second actuator to drive movement of the flap when the cam is uncoupled from the drive arm.

13. The system of claim 12, wherein the controller is to command the second actuator to drive movement of the flap in response to a failure of the first actuator.

14. The system of claim 12, further including a cycloidal drive, the cam to couple with the drive arm in response to rotation of the cycloidal drive.

15. The system of claim 14, wherein the cam includes a first set of teeth and the coupler further includes:

a housing including a second set of teeth; and an output shaft including a third set of teeth, the cam to move from a first position in which the first set of teeth of the cam engage the second set of teeth of the housing to a second position in which the first set of teeth of the cam engage the third set of teeth of the output shaft.

16. The system of claim 15, wherein a shaft of the cycloidal drive is to extend through the housing.

17. The system of claim 12, further including a brake coupled to the drive arm, the controller to activate the brake in response to a failure of the first actuator.

18. The aircraft of claim 8, wherein the first coupler includes a cam and a shaft, a first portion of the cam engaged with a corresponding portion of the shaft when the spring is in the compressed position.

19. The aircraft of claim 18, wherein the first coupler includes a housing, the first portion of the cam engaged with a corresponding portion of the housing when the spring is in the extended position.

20. The aircraft of claim 19, wherein the first coupler includes a drive ring coupled to the cycloidal drive, the drive ring to rotate to cause the first portion of the cam to engage with the corresponding portion of the shaft or the corresponding portion of the housing.

* * * * *